(12) United States Patent
Hirano et al.

(10) Patent No.: US 8,794,215 B2
(45) Date of Patent: Aug. 5, 2014

(54) METHOD OF PRODUCING COMMON RAIL AND COMMON RAIL

(75) Inventors: Koji Hirano, Tokyo (JP); Atsushi Sugihashi, Tokyo (JP); Hirofumi Imai, Tokyo (JP); Yasushi Hasegawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 976 days.

(21) Appl. No.: 12/736,247

(22) PCT Filed: Mar. 5, 2010

(86) PCT No.: PCT/JP2010/001572
§ 371 (c)(1),
(2), (4) Date: Sep. 22, 2010

(87) PCT Pub. No.: WO2010/103772
PCT Pub. Date: Sep. 16, 2010

(65) Prior Publication Data
US 2011/0005493 A1    Jan. 13, 2011

(30) Foreign Application Priority Data
Mar. 12, 2009  (JP) ................. 2009-059918

(51) Int. Cl.
*F02M 55/02* (2006.01)
*F02M 63/00* (2006.01)
*B23P 17/00* (2006.01)
*F02M 63/02* (2006.01)
*B23P 19/04* (2006.01)

(52) U.S. Cl.
CPC ......... *F02M 55/025* (2013.01); *F02M 63/0225* (2013.01); *B23P 19/042* (2013.01)
USPC ............ 123/468; 123/456; 123/447; 29/888; 29/888.01; 29/402.07

(58) Field of Classification Search
USPC ................ 123/447, 456, 468–470; 29/88.01, 29/889.5, 890.09, 402.07
See application file for complete search history.

(56) References Cited

U.S. PATENT DOCUMENTS

| 5,221,039 A * | 6/1993 | Jung et al. ................... 228/195 |
| 8,354,613 B2 * | 1/2013 | Sugihashi et al. ....... 219/121.85 |

(Continued)

FOREIGN PATENT DOCUMENTS

| JP | 07-246483 | 9/1995 |
| JP | 2004-27968 | 1/2001 |

(Continued)

OTHER PUBLICATIONS

International Search Report dated May 18, 2010 issued in corresponding PCT Application No. PCT/JP2010/001572.

*Primary Examiner* — Hieu T Vo
*Assistant Examiner* — Sherman Manley
(74) *Attorney, Agent, or Firm* — Kenyon & Kenyon LLP

(57) ABSTRACT

The present invention provides a method of producing a common rail having a common rail body and a holder which include chemical components of 0.01-0.3 mass % of C, 0.01-0.5 mass % of Si, 0.01-3.0 mass % of Mn, 0.0003-0.01 mass % of B, 0.001-0.01 mass % of N, over 0.01-0.5 mass % of Al, 0.01-0.05 mass % of Ti, P limited to 0.03 mass % or less, S limited to 0.01 mass % or less, O limited to 0.01 mass % or less, a total content of As, Sn, Sb, Pb, and Zn limited to 0.015 mass % or less, the balance including Fe and inevitable impurities, in which the TLB value is 0.001% or more, the method including: inserting an insert metal; performing liquid phase diffusion bonding; performing laser-peening; and removing a surface layer.

12 Claims, 13 Drawing Sheets

(56) References Cited

U.S. PATENT DOCUMENTS

| | | | |
|---|---|---|---|
| 2006/0163321 A1* | 7/2006 | Hasegawa et al. | 228/101 |
| 2010/0055490 A1* | 3/2010 | Sugihashi et al. | 428/596 |

FOREIGN PATENT DOCUMENTS

| | | |
|---|---|---|
| JP | 3373638 | 11/2002 |
| JP | 3373638 | 2/2003 |
| JP | 2003-214291 | 7/2003 |
| JP | 2004-27968 | 1/2004 |
| JP | 2004-83980 | 3/2004 |
| JP | 2004-204714 | 7/2004 |
| JP | 2006-322446 | 11/2006 |
| JP | 2007-40244 | 2/2007 |
| JP | 2007-177723 | 7/2007 |
| JP | 2007-177725 | 7/2007 |
| JP | WO2009064013 * | 5/2009 |

* cited by examiner

METHOD OF PRODUCING COMMON RAIL AND COMMON RAIL

TECHNICAL FIELD

This application is a national stage application of International Application No. PCT/JP2010/001572, filed Mar. 5, 2010, which claims priority to Japanese Patent Application No. 2009-059918 filed on Mar. 12, 2009, the content of which is incorporated herein by reference.

BACKGROUND ART

A machine component having a fluid passage is liable to experience stress concentration at the ends of the fluid-conveying tube and regions of the tube where its diameter changes radically so that fatigue fractures caused by fluid pressure fluctuation may become an issue.

A common rail is a tubular component which is provided between a pump for pumping diesel fuel and injectors in a diesel engine accumulator fuel-injection system, so as to store fuel under pressure. FIG. 1 is a schematic cross-section of a common rail 1. A rail hole 5, which is the main pipe of the common rail 1, functions to store pressurized diesel fuel. The rail hole 5 is provided with a number of branch holes 6 which open to the vertical direction, and the diesel fuel is pumped through the branch holes 6 to associated injectors. The rail hole 5 has an inside diameter "$d_1$" of about 10 mm, and the branch holes 6 have an inside diameter "$d_2$" of about 1 mm. During engine operation, diesel fuel is periodically pumped and the pressure of the diesel fuel in the common rail 1 therefore varies periodically. In the course of the periodic pressure variation, the rail hole 5 and the branch holes 6 shown in FIG. 1 experience periodic variation in circumferential tensile stress. FIG. 2 shows an enlarged view of the boundary peripheral region between the inside surface of the branch hole 6, which is an opening peripheral zone of the branch hole 6, and the inside surface of the rail hole 5. Among the different sectors of the opening peripheral zone of the branch hole 6, the zones 7 near the opposite ends of the diameter of the branch hole 6 parallel to the longitudinal direction of the rail hole 5 are zones where the tensile stresses of the two holes 5 and 6 are added. Therefore, these zones 7 experience greater tensile stress than other zones and tend to undergo fatigue fracture owing to internal pressure variation. Improvement of fatigue strength against internal pressure variation (internal pressure fatigue strength) would enable high-pressure injection of fuel and is therefore desirable from the aspects of clean exhaust gas and fuel efficiency.

Up to now, improvement of fatigue strength has generally been approached by using high-strength steel to increase the fatigue strength of the common rail. However, this method degrades the formability and workability of the common rail owing to the high strength of the steel and increases cost in proportion to steel performance enhancement. In response to these problems, Patent Document 1, for example, teaches an invention that replaces the conventional method of producing a common rail by monolithic forging and mechanical processing with a method of producing a welded common rail by liquid phase diffusion bonding. Further, Patent Document 2 teaches an invention related to steels suitable for liquid phase diffusion bonding that do not require controlled cooling during bonding. However, the steel taught by this patent reference has a tensile strength of about 600 MPa and as such is deficient in strength for use at 1500 atm or even 2000 atm and higher pressure common rails needed to realize the high-fuel efficiency aimed at in recent years. Although the steel strength can be markedly improved by heat treatments and the like, this approach makes processing difficult and greatly increases production cost. In addition, in the case where the processing exposes oxides and/or inclusions such as MnS, $Al_2O_3$, CaO and the like at the surface of the maximum principal stress regions, the oxides and/or inclusions become fatigue fracture starting points during internal pressure application. This seriously impairs stable production of high-strength common rails and is a problem that cannot be overcome.

Moreover, attempts have not been limited to the ordinary method of increasing steel strength. Regarding common rail strength, for example, Patent Document 3 and Patent Document 4 teach methods of mitigating stress concentration by using fluid polishing or coining treatment to chamfer the edges of the branch hole opening region edges. Improvement of fatigue strength by imparting compressive stress has also been studied. Laser peening is one technology that has been developed. In this technology, a liquid or other transparent medium is provided on the surface of a metal object and a pulsed laser beam of high peak power density is directed onto the metal surface. Then, utilizing the expansion reaction force of the plasma produced thereat, residual compressive stress is imparted near the surface of the metal object. A method utilizing this technology is taught by Patent Document 5, for example. A laser beam can be transmitted even to narrow regions such as the inner surface of the rail hole and the inner surfaces of the branch holes of the common rail, thus, laser peening is currently the only method available for imparting high compressive stress in the vicinity of the branch hole openings of the common rail. Thus, as can be seen from Patent Document 6, effective methods for applying laser peening to common rails are being explored.

While the method taught by Patent Document 6 enables considerable improvement of common rail fatigue strength, it has the following drawbacks from the aspects of system and effect. When the laser beam is directed onto the sample surface during laser peening, the surface layer at and around the laser spot melts and resolidifies, so that the surface layer near the laser spot often declines in compressive stress. A known way to avoid this problem is to provide a sacrifice layer for absorbing the laser beam. However, a complex system is required for setting the sacrifice layer at the branch hole opening regions of the common rail. It is therefore desired to avoid this process from the viewpoint of cost and productivity.

Patent Document 5 discloses methods for removing heat affected zones. The methods including a process of producing a laser-beam-controlled electric discharge between a laser-beam-exposed surface and an electrode installed facing near the laser-beam-exposed surface, and a process of conducting electrolytic polishing between an electrode installed facing the laser-beam exposed surface and near the surface irradiated with the laser beam, using an electrolyte liquid as a transparent liquid provided in contact with the laser-beam-exposed surface. However, accurate and stable processing to the desired shape is difficult with these methods because the influence of the laser-beam irradiation is great. The methods are therefore unsuitable for industrial manufacture of common rails. As reported in Patent Document 6, the aforesaid problem of a decline in compressive stress is mitigated by increasing the superimposed area of the adjacent pulsed laser beam spots. However, in order to boost the effect of improving the common rail fatigue strength to a still higher level, it is necessary to maximize the compressive stress near the surface layer, therefore, a different approach is desired.

RELATED ART DOCUMENT

Patent Document

[Patent Document 1] Japanese Unexamined Patent Application, First Publication No. 2007-40244
[Patent Document 2] Japanese Unexamined Patent Application, First Publication No. 2004-83980
[Patent Document 3] Japanese Unexamined Patent Application, First Publication No. 2004-204714
[Patent Document 4] Japanese Unexamined Patent Application, First Publication No. 2004-27968
[Patent Document 5] Japanese Patent Publication No. 3373638
[Patent Document 6] Japanese Unexamined Patent Application, First Publication No. 2006-322446

DISCLOSURE OF THE INVENTION

Problems to be Solved by the Invention

One object of the present invention is to overcome the aforesaid problems by providing a common rail and a method of producing a common rail excellent in fatigue strength from an inexpensive steel by conducting laser-peening with respect to zones that are located near the common rail branch hole openings and are liable to become starting points of fatigue fracture caused by stress concentration.

Means for Solving the Problems

The present invention employs the following methods and a configuration for solving the above-mentioned problems.
(1) A first aspect of the present invention is a method of producing a common rail having a common rail body in which a rail hole and a branch hole which is formed in a cylindrical wall region enclosing the rail hole are formed, and a holder in which a communication hole communicating with the branch hole is formed. The common rail body and the holder contain chemical components of 0.01-0.3 mass % of C, 0.01-0.5 mass % of Si, 0.01-3.0 mass % of Mn, 0.0003-0.01 mass % of B, 0.001-0.01 mass % of N, over 0.01-0.5 mass % of Al, and 0.01-0.05 mass % of Ti, wherein P is limited to 0.03 mass % or less, S is limited to 0.01 mass % or less, O is limited to 0.01 mass % or less, the total content of As, Sn, Sb, Pb, and Zn is limited to 0.015 mass % or less, the balance includes Fe and inevitable impurities, and the TLB value represented by Formula (1):

$$TLB=(B\%)-[(N\%)/1.3-\{(Ti\%)/3.4+(Al\%)/4.1\}\times(Al\%)\times52]$$

is 0.001% or more. This method of producing the common rail includes: inserting an Ni-based or Fe-based insert metal having 1 mass % or more of B, between the common rail body and the holder; performing liquid phase diffusion bonding so as to bond the common rail body, the insert metal, and the holder with a load of 1 MPa or more for 30 seconds or more at a bonding temperature of 1000-1300° C.; performing laser-peening by irradiating a pulsed laser beam with respect to a boundary peripheral region between an inside surface of the branch hole located near an opening peripheral zone of the branch hole, and an inside surface of the rail hole, the boundary peripheral region being provided with transparent liquid; and removing a surface layer of the opening peripheral zone, thereby increasing the fatigue strength of the opening peripheral zone.

(2) In the method of producing the common rail according to (1), at least one of the common rail body and the holder may further contain at least one of 0.01-2.0 mass % of Ni, 0.01-1.0 mass % of Co, 0.01-1.0 mass % of Cu, and 0.01-2.0 mass % of W.
(3) In the method of producing the common rail according to (1), at least one of the common rail body and the holder may further contain at least one of 0.001-0.05 mass % of Zr, 0.001-0.05 mass % of Nb, and 0.001-0.5 mass % of V.
(4) In the method of producing the common rail according to (1), at least one of the common rail body and the holder may further contain at least one of a sulfide shape control element and a rare earth element, the sulfide shape control element being selected from one or more of 0.0005-0.005 mass % of Ca, 0.0005-0.005 mass %, of Mg and 0.0005-0.005 mass % of Ba, and the rare earth element being selected from one or more of 0.001-0.05 mass % of Y, 0.001-0.05 mass % of Ce, and 0.001-0.05 mass % of La.
(5) In the method of producing the common rail according to any one of (1)-(4), the removing of the surface layer of the opening peripheral zone may be conducted by electrolytic polishing or fluid polishing.
(6) In the method of producing the common rail according to any one of (1)-(4), the pulse energy of the pulsed laser beam may be 1 mJ to 10 J.
(7) In the method of producing the common rail according to any one of (1)-(4), a zone to which the laser-peening is performed and a zone from which the surface layer is removed may incorporate a zone at the inner surface of the rail hole that satisfies Formula (2):

Distance from center of branch hole≤Diameter of branch hole×0.6, and

Formula (2'):

Angle between line segment drawn toward the center of a branch hole at an inner surface of a rail hole and the longitudinal direction of the rail hole≤10°, the thickness of the removed surface layer being 0.01-0.3 mm at the zone satisfying the Formula (2) and the Formula (2').
(8) In the method of producing the common rail according to any one of (1)-(4), the removing of the surface layer of the opening peripheral zone may cause a radius of curvature of a shape line at the opening peripheral zone of the branch hole viewed in a cross-section extending in a longitudinal direction of the rail hole and including a center line of the branch hole to be 15 μm or greater at points of a region satisfying Formula (3):

Diameter of branch hole×0.5≤Distance from center of branch hole≤Diameter of branch hole×0.6.

(9) In the method of producing the common rail according to any one of (1)-(4), the opening peripheral zone may be chamfered before conducting the laser-peening.
(10) In the method of producing the common rail according to (9), a zone to be chamfered may incorporate a zone satisfying the Formula (2) and the Formula (2').
(11) In the method of producing the common rail according to any one of (1)-(4), the transparent liquid used in the laser-peening may be alcohol or water containing a rust inhibitor.
(12) A second aspect of the present invention is a common rail including a common rail body in which a rail hole and a branch hole which is formed in a cylindrical wall region enclosing the rail hole are formed, and a holder in which a communication hole communicating with the branch hole is formed. The common rail body and the holder contain chemical components of 0.01-0.3 mass % of C, 0.01-0.5 mass % of Si, 0.01-3.0 mass % of Mn, 0.0003-0.01 mass % of B, 0.001-0.01 mass % of N, over 0.01-0.5 mass % of Al, and 0.01-0.05 mass % of Ti, wherein P is limited to 0.03 mass % or less, S is limited to 0.01 mass % or less, O is limited to 0.01 mass % or less, the total content of As, Sn, Sb, Pb, and Zn is limited to 0.015 mass % or less, and the balance includes Fe and inevitable impurities, the TLB value is represented by Formula (1):

TLB=(B %)−[(N %)/1.3−{(Ti %)/3.4+(Al %)/4.1}×
(Al %)×52]

is 0.001% or more, the opening peripheral zone has a shape in which a radius of curvature of a shape line at the opening peripheral zone of the branch hole viewed in a cross-section extending in a longitudinal direction of the rail hole and including a center line of the branch hole is 15 μm or greater at points of a region satisfying Formula (3):

Diameter of branch hole×0.5≤Distance from center of branch hole≤Diameter of branch hole×0.6, and a compressive stress value in a direction perpendicular to a longitudinal direction of the rail hole in the cross-section is −200 MPa or greater.

Effects of the Invention

According to the methods of producing the common rail as described in (1)-(11), since diffusion bonding is employed, common rails can be produced from easily-processable shaped block units of a base material. Therefore, the production cost can be reduced. Moreover, at opening peripheries of branch holes on the rail hole side of a common rail, which are regions where fatigue strength becomes an issue, high compressive stress can be introduced from the surface, and stress concentration can be mitigated by improving the shape of the branch hole opening regions. As a result, fatigue strength can be improved markedly. Further, according to the common rail as described in (12), high-pressure fuel injection to clean an exhaust gas and enhance fuel efficiency can be achieved by using an inexpensive steel, thereby making it possible to derive industrially useful effects.

EMBODIMENTS OF THE INVENTION

Figure 1:
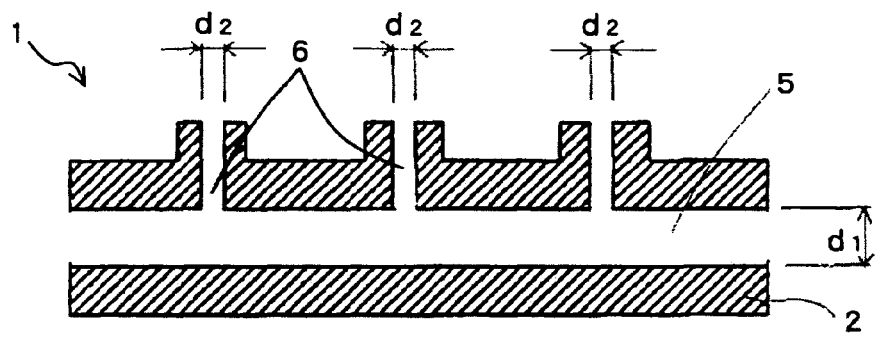
FIG. 1 is a cross-sectional view of a common rail in the longitudinal direction of the rail hole.
Figure 2:
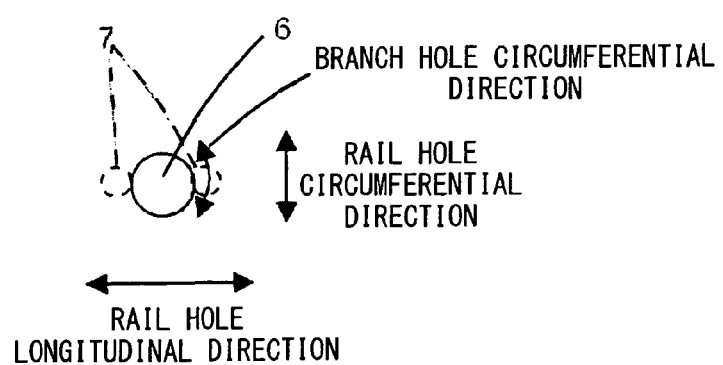
FIG. 2 is a plan view of a branch hole opening peripheral zone of a common rail.

The present inventors conducted studies for overcoming the aforesaid problems. As a result, the present inventors learned that a common rail produced from an inexpensive steel can be markedly improved in fatigue strength by a method including: producing easily-processable shaped block units of a high-strength steel having specific chemical components suitable for liquid phase diffusion bonding; conducting liquid phase diffusion bonding; conducting laser-peening to impart compressive stress to branch hole opening peripheries in the vicinity of rail hole where fatigue strength is a concern; and conducing electrolytic polishing or the like to remove a part of regions of steel including the laser-peened zones. Here, since liquid phase diffusion bonding is employed to attach a holder for fastening a tube outward of each branch hole, the processing of the high-strength steel is facilitated. Thus, production cost is reduced. In addition, decline in fatigue strength, which occurs when inclusions and/or oxides are exposed at the maximum principal stress regions (branch hole opening regions) and is fatal to high-strength steel, is compensated for by laser-peening regulated for common rail strengthening. Therefore, it is possible to realize production of a non-conventional high-pressure-resistant common rail at low cost.

The method of producing a common rail and the common rail according to preferred embodiments of the present invention are explained hereinafter with reference to the attached drawings. In order to avoid redundant explanation, the same reference numerals are assigned for elements having substantially the same function throughout the specification and drawings and explanations thereof are omitted.

FIG. 1 is a schematic cross-sectional view of a common rail 1. A rail hole 5 formed within a cylindrical wall region 2 is the main pipe of the common rail 1 and is responsible for storing pressurized diesel fuel. The rail hole 5 is provided with multiple branch holes 6 which extend normal to the rail hole 5.

Figure 3:
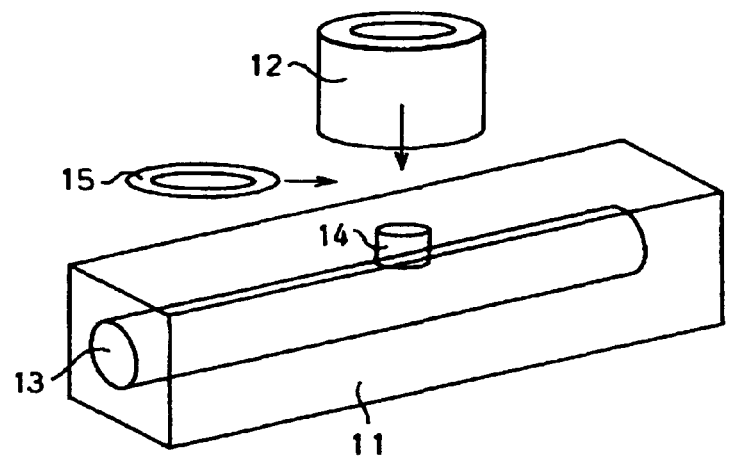
FIG. 3 is a perspective view showing a common rail production process.

In order to produce a common rail at low cost, liquid phase diffusion bonding is performed in the present invention. More specifically, as shown in FIG. 3, an amorphous alloy metal foil (insert metal) 15 for liquid phase diffusion bonding is interposed between ring-shaped bonding faces formed by a common rail body 11 having a pipe conduit 13 passing therethrough in the longitudinal direction of the common rail body 11 and a cylindrically shaped holder 12, so as to communicate the branch tube 14 with the cylindrically shaped holder 12. Then, liquid phase diffusion bonding is performed by fusion-upset welding of the alloy metal foil 15, the common rail body 11 and the holder 12 by resistance welding and the like, to form a joint. In the interest of drawing simplicity, only one branch tube 14 is shown FIG. 3. However, a number of branch tubes 14 corresponding to the number of injection nozzles installed at the engine combustion chambers is ordinarily provided. In order to connect the branch tubes 14 and tubes for pumping fuel to the injection nozzles of the engine combustion chambers, a number of holders 12 corresponding to the number of branch tubes 14 of the common rail body 11 is provided. In the common rail formed in this manner, the pipe conduit 13 in FIG. 3 corresponds to the rail hole 5 in FIG. 1, and the interiors of the branch tubes 14 in FIG. 3 correspond to the branch holes 6 in FIG. 1. For the alloy metal foil 15 used in liquid phase diffusion bonding, a Ni-based or Fe-based insert metal containing at least 1% or more of B is employed. The liquid phase diffusion bonding of the common rail body 11 and the holder 12 is conducted by applying and maintaining a stress of 1 MPa or greater for 30 seconds or longer with a bonding temperature of 1100-1300° C.

In this embodiment, a steel that has an adequately low-temperature transformation structure even without controlled cooling after liquid phase diffusion bonding. That is, a steel having a high hardenability capable of inducing bainite or martensite transformation throughout or at required regions of the steel is selected in advance at the design stage. Thus, a steel having alloy composition by which an adequately uniform structure is obtained even at a region of isothermally solidified joints formed by liquid phase diffusion bonding is employed as a material of the common rail 1. More specifically, for example, the following steel used in liquid phase diffusion bonding is employed as a material of the common rail body 11 and the holder 12. The preferable content ranges of chemical components of the steel used in liquid phase diffusion bonding are explained below. It should be noted that the symbol "%" used with respect to chemical components in the following means mass %.

C is the most basic element for controlling steel hardenability and strength. If the C content is less than 0.01%, a required strength cannot be obtained, and if the C content is more than 0.3%, the strength of the steel improves but the required toughness of the joint cannot be obtained. The C content is therefore set in a range of 0.01-0.3%. If the C content falls within this range, the structural control of the steel is possible in the "as bonded" state of the steel. For stably and industrially obtaining the effects of carbon, the C content is preferably 0.05-0.3%.

Si is a steel deoxidizer that is usually added together with Mn for the purpose of reducing the oxygen concentration of the steel. Since Si is also necessary for intragranular strengthening, the deficient content of Si lowers the strength of the steel. In the present invention, a predetermined amount of Si is included for the purpose of deoxidization and intragranular strengthening. If the Si content is 0.01% or more, the above-mentioned effects are exhibited, and if the Si content is more than 0.5%, steel embrittlement may occur. The Si content is therefore set in a range of 0.01-0.5%. Since there is a case in which complex oxides containing $SiO_2$, such as $SiO_2$—MnO and $SiO_2$—FeO, are formed in the liquid phase diffusion bonded joints, the Si content is preferably 0.01-0.3%.

Mn, which is effective for deoxidization like Si, is added to the steel for enhancing the steel hardenability and contributing to strength improvement. If the Mn content is 0.01% or more, the above-mentioned effect is obtained, but if the Mn content is more than 3.0%, toughness of the liquid phase diffusion bonded joints may decline owing to crystallization of large MnO-type oxides. The Mn content is therefore set in a range of 0.01-3.0%. The Mn content is preferably 0.01-2.0% in view of the need to inhibit $SiO_2$—MnO formation, as explained above regarding Si.

B is very effective for increasing the steel hardenability even if B content is small, but has only a slight hardenability improvement effect at a content of less than 0.0003%. On the other hand, if the B content is more than 0.01%, borocarbides that lower the hardenability of the liquid phase diffusion bonded joints are formed, and thus, the joint strength is reduced. The B content is therefore set in a range of 0.0003-0.01%. In another aspect, since grain boundary segregation of B is pronounced, and may, depending on the post-bonding cooling conditions, cause embrittlement solely at the grain boundaries, the B content is preferably 0.0003-0.005%.

The affinity of Ti to combine with N is stronger than the affinity of Ti to combine with B, so that Ti combines with N more preferably than B. Ti is therefore an important element for securing solute B, which is effective for establishing hardenability. However, this effect is small if the Ti content is less than 0.01%. Meanwhile, if the Ti content is more than 0.05%, not only is saturation effected but also the toughness is reduced owing to abundant precipitation of coarse Ti-type carbonitrides. The Ti content is therefore set to 0.01-0.05%. Further, since Ti also forms borides, the upper limit of the Ti content should be held low if possible, and the preferable range of the Ti content is therefore 0.01-0.03%.

In this embodiment, N is an element desired to be reduced to enhance the effectiveness of B explained above. However, if Al or Ti is added to the steel, N is effective for increasing steel toughness because N combines with Al or Ti to precipitate nitrides such as AlN or TiN, thereby making the crystal grain fine. This effect is small if the N content is less than 0.001%. When the N content exceeds 0.01%, a large amount of N combine with B to generate BN. Thus, in order to obtain solute B, a large amount of Al or Ti addition is required. That is, since it becomes difficult to stably make after-mentioned TLB value be 0.001 or more, the N content is set in a range of 0.001-0.01%. In ordinary steelmaking, a steady addition of 0.008% or greater N increases cost from the aspect of the production process, and the preferred range of the N content is therefore 0.001-0.008%.

Al is a significant element that combines with N to make crystal grains fine by precipitating fine AlN, and to make the steel include B as solute B which is effective in promoting hardenability. It is preferable for the steel to contain over 0.01% of Al to exhibit this effect. However, if the Al content exceeds 0.5%, coarse AlN declines the steel toughness. Therefore, the Al content is set to over 0.01-0.5%. However, since the affinity of Al to combine with O is strong, excessive Al addition may decline joint toughness due to coarse oxide clusters generated by specific steelmaking processes. Therefore, the Al content is preferably set to over 0.01-0.3%.

For increasing the toughness of a high-strength steel like that of the present invention, a high concentration of impurities at the grain boundaries should be avoided as much as possible, thus, the content of P and S are set to 0.03% or less and 0.01% or less, respectively. Moreover, in order to achieve a clean steel with a high toughness, the O content is set to 0.01% or less. The content of each of P, S, O is preferably as small as possible, but taking the cost into account, the lower limit of each may be set to 0.0001%. In addition, reliable achievement of toughness improvement requires that the total content of grain boundary segregated embrittling elements As, Sn, Sb, Pb and Zn be set to 0.015% or less.

In a steel used in liquid phase diffusion bonding containing the above chemical components, the balance including Fe as a main component may contain inevitable impurities which are inevitably mixed into the steel during the steelmaking processes, to the extent that the effects derivable from the present invention are not inhibited. The steel used in liquid phase diffusion bonding according to this embodiment includes at least 0.01-0.05% of Ti, 0.001-0.5% of N, and over 0.01-0.5% of Al, and thus, N is bound with Al and Ti in the steel.

In addition to the above restrictions regarding basic chemical components, the steel having 600 MPa or more of strength due to low temperature transformation caused by a specific cooling condition after liquid phase diffusion bonding, and having a uniform strength distribution at a bonding region, that is, an absolute value of the Vickers hardness difference between the center of the bonding portion and a portion 5 mm apart from the bonding line of 100 or less, is very effective for achieving repeated fatigue strength under high pressure which is required as a steel used in a common rail. That is, in the above example, it is effective to use a steel used in liquid phase diffusion bonding excellent in hardness uniformity at a bonding region in which the difference between the Vickers hardness of a bonding region of the rail body 11 and the holder 12 bonded by the liquid phase diffusion bonding, and the Vickers hardness of two side regions 5 mm apart from the bonding region falls in a range of ±100. This fact was based on the following discoveries from studies conducted by the present inventors, that is, that although laser peening applies a compressive stress to a laser peened portion at which a maximum main stress is loaded, this process also introduces a portion where a tensile stress induced so as not to change the total stress distribution in the steel due to the applied compressive stress, and thus, if the tensile stress generated portion coincidentally located at the bonding region and if the strength variation is large at the bonding region joint, the steel may be fractured from the joint. That is, a steel used in liquid phase diffusion bonding which is excellent in hardness uniformity at a bonding region is required in the present invention. The steel is therefore required not only to contain Al, Ti, N, and B within the above range, but also to suppress ferrite transformation from the grain boundary by binding all N in steel by Al and Ti to avoid B from being bound with N, thereby causing atomic state B segregation at a γ crystal grain boundary. Studies of the present inventors clarified that the chemical component ranges have to be restricted so as to make the TLB value represented by the following Formula (1) be 0.001% or more. If the TLB value is less than 0.001%, a bonding region in which the above-mentioned hardness difference is 100 or less cannot be formed.

$$TLB=(B\%)-[(N\%)/1.3-\{(Ti\%)/3.4+(Al\%)/4.1\}\times(Al\%)\times 52]$$ Formula (1)

The above Formula (1) is determined based on studies of the present inventors newly discovering that a uniform steel property in a joint including a bonded region, especially having a small hardness variation is required for assembling a common rail using a liquid phase diffusion bonding. If the uniformity of the constitution near the joint cannot be obtained, a stress concentration occurs in a liquid phase diffusion bonding joint when the common rail is subjected to an inner pressure fatigue load, and this may cause a fracture from the joint portion. As a result, the main effect of the present invention to enhance a branch hole periphery by performing laser peening to a maximum concentrated stress loaded portion in the common rail may be lost and the effect of the present invention cannot be achieved. Thus, if an alloyed metal foil for a liquid phase diffusion bonding containing 1% or more of B is used, taking a constitutional formation mechanism regarding B during bonded joint cooling into account, it is necessary to introduce a technique to generate solute B segregation at a grain boundary to suppress core generation from the grain boundary, thereby making the strength distribution and the hardenability difference at the joint portion uniform. Accordingly, in this embodiment, chemical components are restricted so as to obtain an adequate content of solute B, by using Ti and Al that bind with N which easily combines with B. If the solute N content is too large with respect to the added B content, BN is generated according to the solubility product. Then, as a total fixed N amount, the following formula of $$[(N\%)/1.3-\{(Ti\%)/3.4+(Al\%)/4.1\}\times(Al\%)\times 52]$$

is determined in which: the atomic number ratio regarding the inversed number 3.4 is set as a N amount that can be bound with Ti; considering the affinity between Al and Ni calculated from separately conducted experiments, the number 1/4.1 which is unique for the steel according to the present invention is set as a N amount that can be bound with Al; each value is multiplied by the factor 52 based on the experimentally calculated Al concentration and the chemical potential based on the interaction between Al and Ti; and these values are subtracted from the corresponding N amount combined with B. Finally, assuming that the bound N does not combine with B, Formula (1) was determined as a TLB value from a view point of an effective B amount contained in the joint unique to the steel in the present invention. This value is a kind of a hypothetical formula for evaluating the effect of B. Since the TLB value thus determined combines the theoretical assumption and the experimental factors, the experimental factors and the TLB value which ensures a uniform constitution are determined by the following experimentation.

Utilizing laboratory scale vacuum-melting or practical steel plate production equipment, steels having chemical components falling in the above-described ranges produced in amounts of 100 kg, 300 kg, 2 tons, 10 tons, 100 tons, and 300 tons by a vacuum melting process or by ordinary "blast furnace"-"converter"-"secondary refinement"-"degassing/trace element addition"-"continuous casting"-"hot rolling" processes, were processed and shaped into simple and small test pieces each having a length of 50 mm in a direction parallel to the rolling direction and a diameter of 10 mm or 20 mm squire. Then, after grounding the end faces of the test pieces to Rmax<100 μm and performing degreasing washing to the end faces, liquid phase diffusion bonding was performed for bonding a pair of test pieces arranged to oppose end faces, by using a tension-compression testing machine equipped with a 150 kW output high-frequency induction heating unit. Here, a 20-50 μm thick Ni—B based or Fe—B based amorphous foil of which at least 50% by volume thereof was substantially amorphous, which can be used for liquid phase diffusion bonding at a temperature of 1000-1300° C., was interposed between the bonding faces, and the liquid phase diffusion bonding was conducted by heating an entire test piece to a required bonding temperature under stress of 1-20 MPa for from 30 seconds to 60 minutes, followed by spontaneous cooling.

From thus obtained rounded bar bonding test piece, round bar tensile test pieces each having a 6 mm diameter at the parallel portion were taken for conducting tensile tests at room temperature, thereby confirming that the test pieces had a strength of 600 MPa, and square bar bonding test pieces were cut to expose each cross section at the center portion of the test piece in a cross section perpendicular to the bonding face, and from a standard position which is the center of the bonding portion specified from the constitution of the cross section, to a base material position 10 mm apart from the standard portion, the hardness values were continuously measured under a 100 g load at 0.1 mm intervals. In each of the above test conditions, the center of the bonding region had an almost maximum hardness value. The hardness was likely to be decreased gradually in the direction from the center of the bonding region to the base material. However, even in the case that the bonding was conducted for the longest time of 60 minutes, the hardness values measured in an area between a portion 5 mm apart from the bonding region and a portion 10 mm further apart therefrom were hardly varied. Therefore, considering the hardness measured at the portion 5 mm apart from the bonding portion as a representative hardness of the base material, the hardness distribution, that is, the strength uniformity of the liquid phase diffusion bonding joint was evaluated based on the absolute value of the hardness difference between the maximum hardness value of the bonding portion and the hardness value of the portion 5 mm apart from the bonding portion. Industrially, if this value varies by 100 or more, a nonuniform joint property affects the fatigue strength of the laser-peened common rail as a component.

Figure 4:
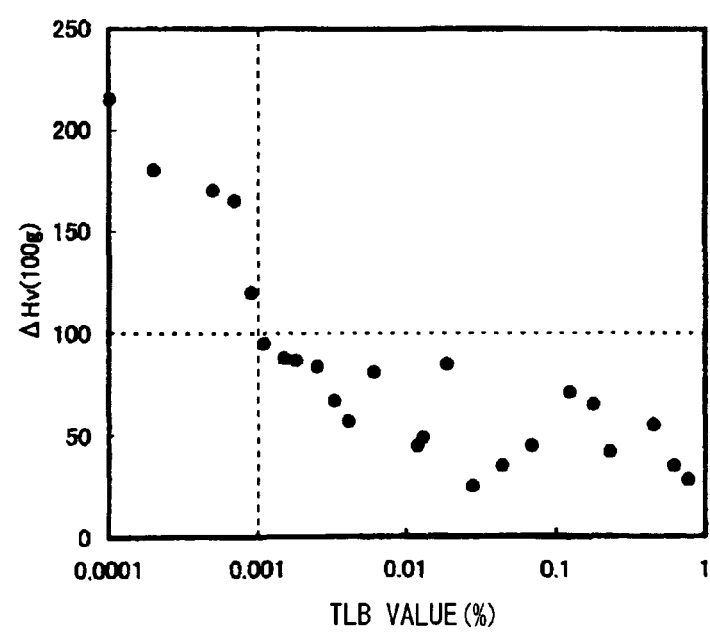
FIG. 4 is a graph showing a relationship between a TLB value and an absolute value of a hardness difference between a bonded region of a liquid phase diffusion bonded joint and a base material region (Vickers hardness value measured at a region 5 mm apart from the bonded region).

FIG. 4 shows a relationship between ΔHv (100 g) that represents the above-mentioned hardness difference and the above-mentioned TLB value which is a parameter of grain boundary B segregation. It is clarified from this figure that if the TLB value is 0.001 or more, ΔHv indicates 100 or less and joint uniformity is thus obtained. Each factor in the TLB parameter formula was experimentally determined based on chemical components of several melted steels produced to make a relativity shown in FIG. 4 become prominent. That is, controlling of the parameter TLB value made it possible for steel satisfying the above chemical component ranges to have a non-heat treated joint after liquid phase diffusion bonding that has a uniform strength at the joint portion, that is, a joint having a hardness difference ΔHv value of 100 or less. Further, the liquid phase diffusing bonded joint thus obtained is required to have not only strength uniformity, but also a toughness of 47 J under 0° C. so as to prevent brittle fracture of the joint. Then, taking 2 mm U-notch Charpy impact test pieces from the obtained square bar test pieces, the absorption energies were measured at each of the notches provided at the joint portion in accordance with the method described in JIS Z 2202. As a result, it was discovered that a toughness of 47 J or more can be obtained if the TLB value is 0.001 or more.

Figure 5:
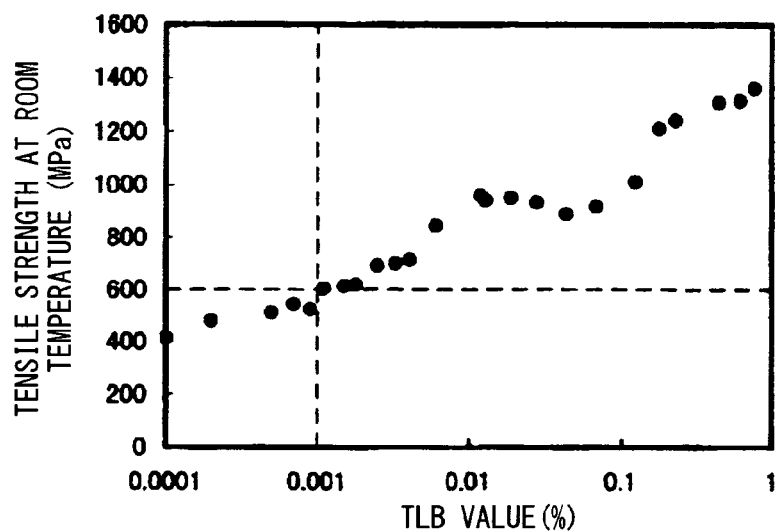
FIG. 5 is a graph showing a relationship between a TLB value and the tensile strength of a liquid phase diffusion bonded joint.

Further, FIG. 5 shows a relationship between the TLB value and the tensile strength. This relationship shows that if the TLB value is 0.001% or more, the steel including chemical components limited in the present invention can achieve a tensile strength of 600 MPa or more. The tensile test was conducted based on JIS Z 2241.

In the method of producing common rail according to the embodiment of the present invention, a common rail body (FIG. 3) and cylindrical holders 12 fabricated of a steel having the chemical components as explained above are welded together by liquid phase diffusion bonding, laser-peening is conducted to impart compressive stress to opening peripheries of branch holes 6 (FIG. 1) on the rail hole 5 side of the common rail body where fatigue strength is a concern, and electrolytic polishing or the like is further conducted to remove a part of the steel from the opening peripheries.

Figure 6:
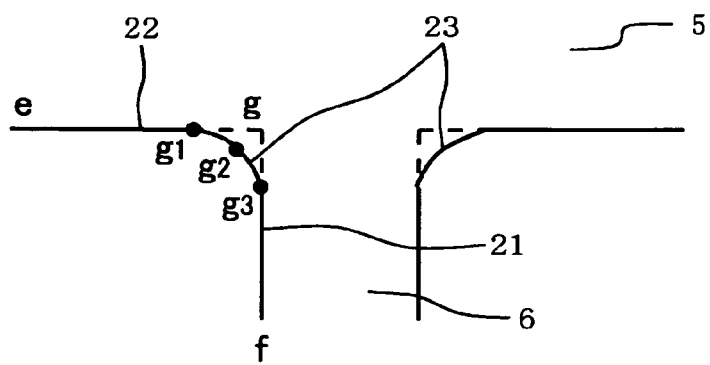
FIG. 6 is a cross-sectional view of a branch hole opening peripheral zone of a common rail.

FIG. 6 is an enlarged cross-sectional view of the opening peripheral zone of a branch hole 6 of the common rail 1 where reinforcement is required. In the local reinforcement method according to the first embodiment of the present invention, after the branch hole 6 has been formed and the corner "egf" in FIG. 6 still has a substantially right angle, the region designated by the line segment "g1" to "g" (inner surface of the rail hole 5 located near the opening peripheral zone 23) is laser-peened. Then, by removing a part of the steel present near the opening peripheral zone 23, the curved shape "g1g2g3" is defined. Then, the fatigue strength is increased. In this specification, the "branch hole opening peripheral zone 23 of the branch hole 6" is defined to encompass the region of the rail hole inner surface 22 within a distance of 5 times the diameter "d2" (FIG. 1) of the branch hole 6 from the center of the branch hole 6, the region of the branch hole inner surface 21 within a distance of 0.3 times the diameter "$d_1$" (FIG. 1) of the rail hole 5 from the opening of the rail hole inner surface 22, and the connecting surface between the two that connects the branch hole 6 and the rail hole 5.

The laser-peening method will be explained first. Laser peening requires (i) a laser beam of high peak power density and (ii) provision of a transparent medium such as water in the vicinity of the irradiated surface. To satisfy the condition (i), the peak power density at the irradiated surface is set to 1-100 TW/m$^2$ in this embodiment. This peak power density is preferably obtained by using a laser system that intermittently emits a laser pulse of a pulse duration of about 10 ps to 100 ns and a pulse energy of about 0.1 mJ-100 J. As such a laser system, the Nd:YAG laser can be used, but any laser system that satisfies the aforesaid condition (i) is usable. When the conditions (i) and (ii) are satisfied, expansion of plasma generated by irradiation with the pulsed laser beam having a high peak power density is restricted by the water or other transparent medium present in the vicinity of the irradiated surface, so that the pressure of the plasma increases. Since the reaction force of the plasma raised to a high pressure plastically deforms the vicinity of the irradiation point, residual compressive stress can be imparted.

Figure 7:
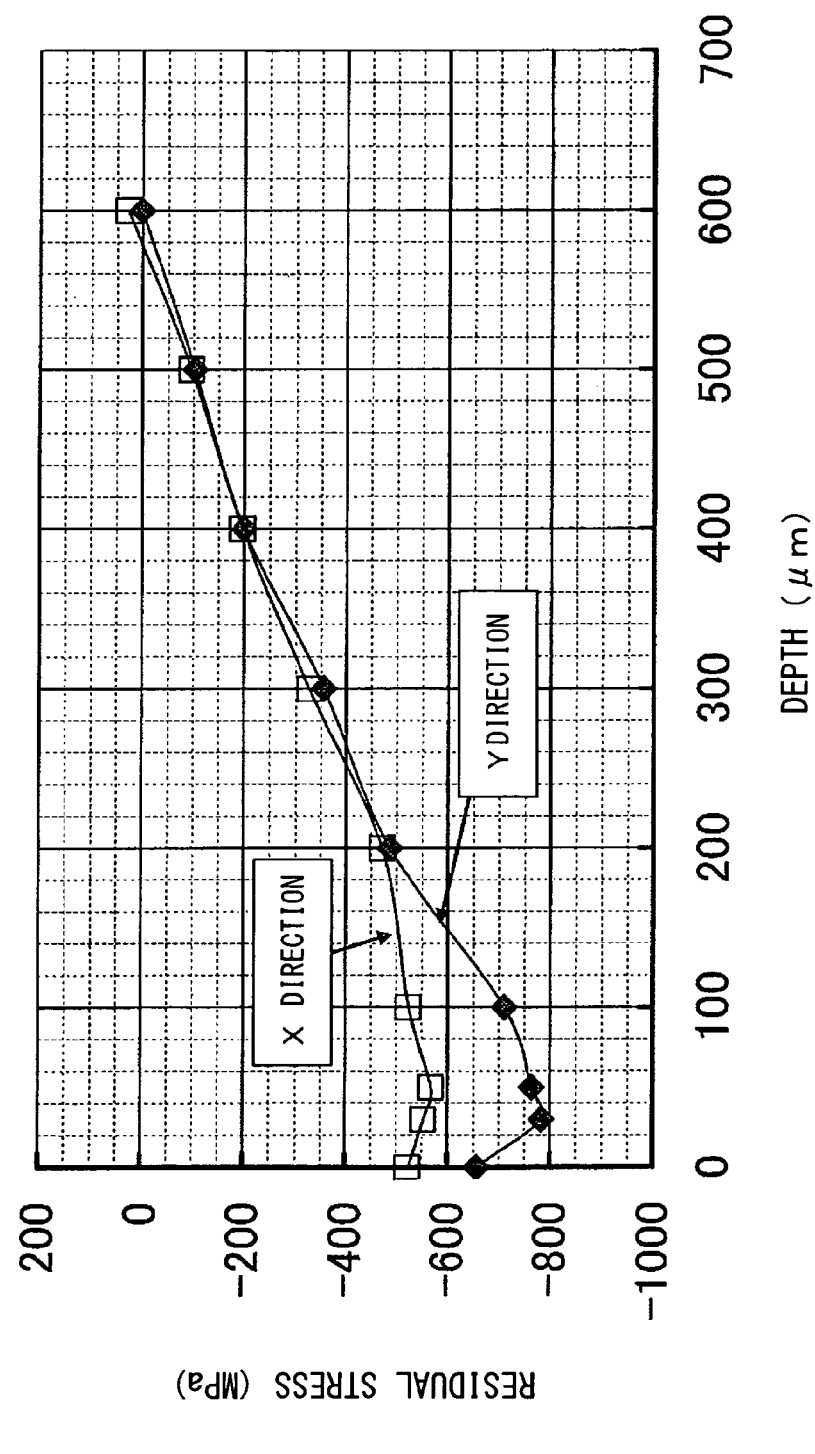
FIG. 7 is a graph showing residual stress of a laser-peened test piece.
Figure 8:
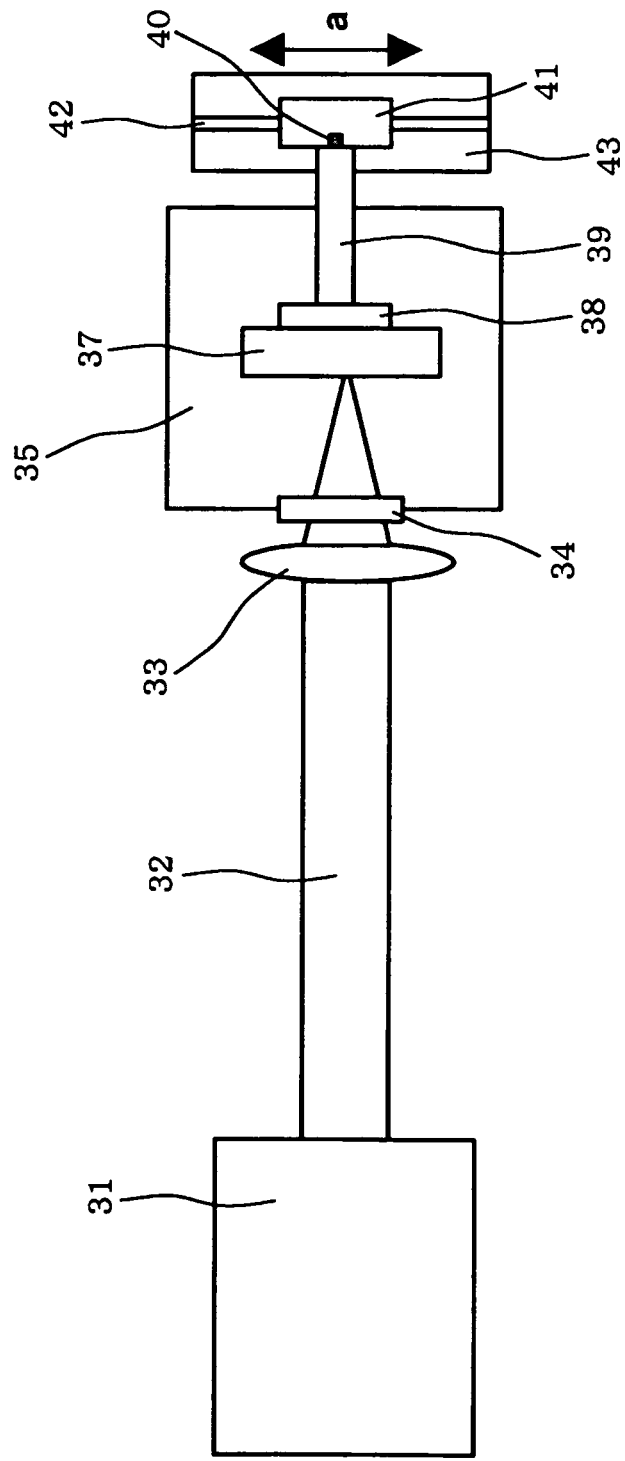
FIG. 8 is a plan view showing a laser beam irradiation apparatus.
Figure 9:
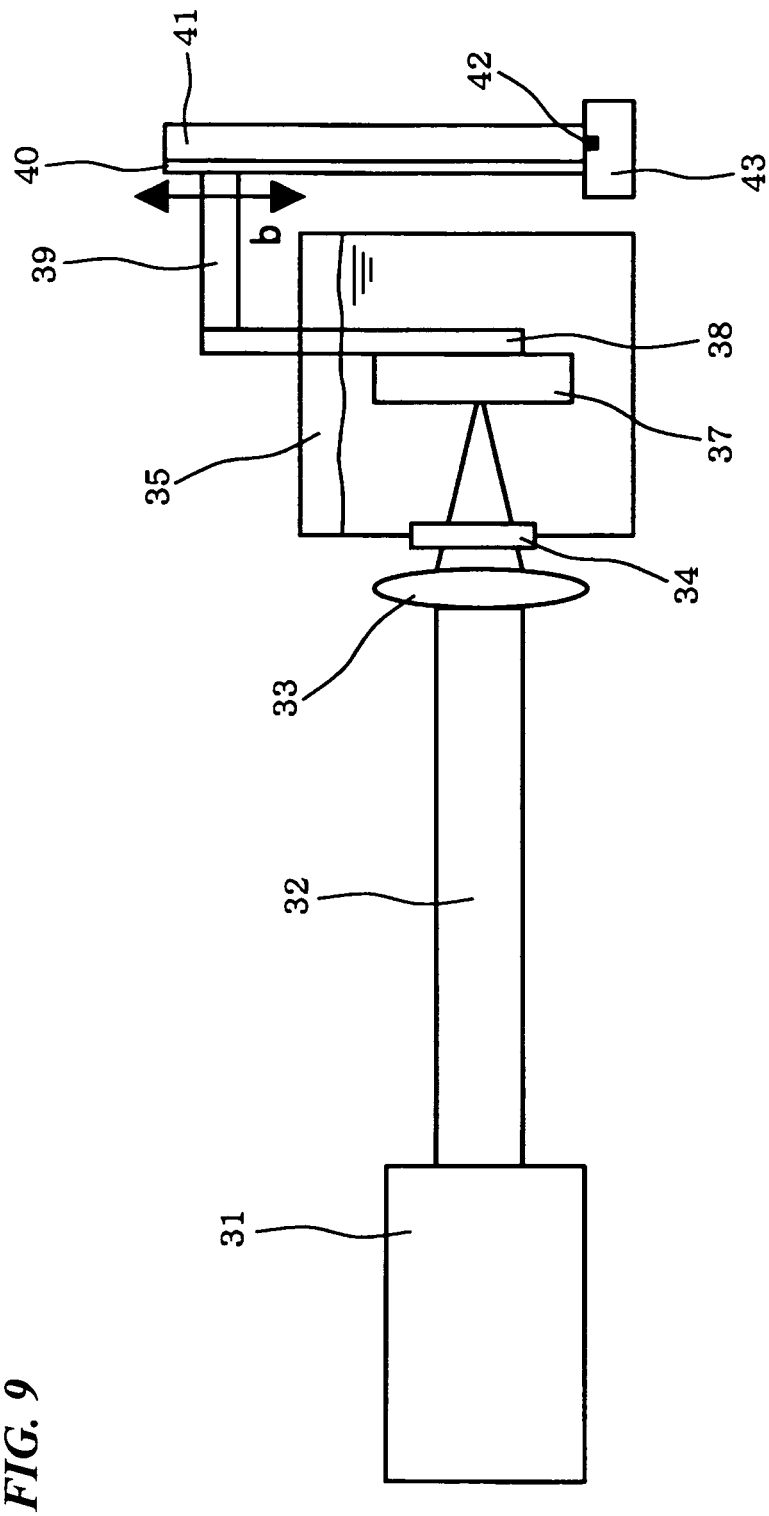
FIG. 9 is a front view of the apparatus shown in FIG. 8.
Figure 10:
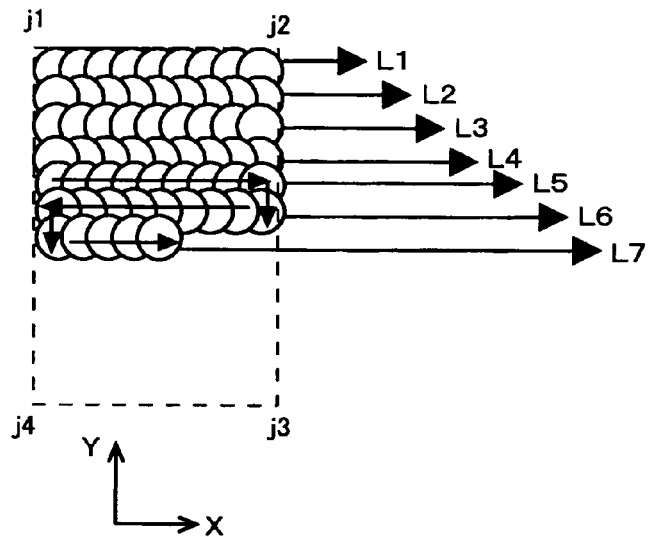
FIG. 10 is a plan view showing a laser beam irradiation method.

In the interest of more clearly explaining the reason for the fatigue-strength improvement by the production method of the present invention, the characteristics of stress introduction by laser-peening will be discussed. FIG. 7 shows the results obtained when a flat plate-like test piece made of a steel having a tensile strength of 1000 MPa was laser-peened and the distribution of the residual stress in the depth direction was measured with an x-ray residual stress analyzer. The measurement of stress distribution in the depth direction was performed while progressively removing a part of the steel by electrolytic polishing. In the laser-peening performed by using the apparatus shown in FIG. 8 (plan view) and FIG. 9 (front view), a laser beam 32 from a laser beam generator 31 was directed onto a test piece 37 immersed in water contained in a water tank 35. The second harmonic wave of an Nd:YAG laser (wavelength: 532 nm) was used as the laser beam because of its good water penetrating power. The laser beam 32 was focused with a focusing lens 33 that was a convex lens of 100 mm focal length and directed onto the test piece 37 through an optical window 34. The beam spot formed on the test piece 37 was circular having a diameter of 0.8 mm. The pulse energy of the laser was set to 200 mJ and the peak power density of the laser was set at 40 TW/m$^2$. The pulse duration was 10 ns and the pulse repetition frequency was 30 Hz. The rear of the test piece 37 was attached through supports 38, 39 to a guide 40 slidable vertically (in the direction of an arrow "b") as shown in FIG. 9. As shown in FIG. 8, the guide 40 was connected to a support 41 attached to a guide 42 slidable in the horizontal direction (in the direction of an arrow "a"). The test piece 37 was installed to be movable along the guides 40 and 42 in the "a" and "b" directions under the control of a scanner 43. FIG. 10 shows a method for superimposed scanning of the pulsed laser beam spot. The processed region was a 5 mm×10 mm rectangle (in FIG. 10, "$j_1j_2$"=5 mm, "$j_2j_3$"=10 mm). The average number of times that a given spot was irradiated with the pulsed laser beam was set to 25 and processing was performed to make the interval between adjacent beam spots in a given scanning region Li and the distance between the centers of adjacent scanning regions (e.g., L1 and L2 in FIG. 10) equal to each other. The scanning regions were formed continuously, in the manner of "L1→L2→L3 . . . " in FIG. 10. The measurement results in FIG. 7 shows that the compressive stress was introduced to a depth of about 0.6 mm. Moreover, owing to the use of the superimposed scanning method shown in FIG. 10, compressive stress in the Y direction in FIG. 10 was selectively strengthened.

As shown in FIG. 7, Y-direction residual stress was −783 MPa at depth of 30 μm, where residual compressive stress was maximum. However, since residual stress at the processed steel surface (depth: 0 mm) was only −656 MPa, strengthening of surface residual stress was not altogether adequate. This was because the laser beam directed onto the sample surface melted and resolidified the surface layer at and around the laser spot.

In the production method of the present invention, the laser-peening explained above is followed by removal of a part of the steel from a region including the laser-peened surface. Removal of a part of the steel by mechanical polishing has an adverse effect on fatigue properties because it leaves residual tensile stress in the surface after the removal, therefore, electrolytic polishing or fluid polishing is preferably chosen as the removal method. In electrolytic polishing, an etching solution is applied to the opening peripheral zone 23 (FIG. 6) and in most cases polishing is performed by applying electric current through a spherical projection pressed onto the location being polished. In fluid polishing, polishing is performed by passing a liquid containing an abrasive through the rail hole 5 and branch holes 6. In both methods, polishing proceeds concentrically with the axis of each branch hole 6 at the center. This removal process enables removal of a part of the steel near the surface layer whose stress was shifted toward the tensile side and the residual stress therein was made smaller than that of a slightly inner region of the steel, due to melting and resolidification owing to the laser-peening. Since it also relaxes the stress concentration factor by changing the shape of the opening peripheral zone 23, the maximum load stress during actual use is reduced. The present inventors discovered that these effects act synergistically to greatly improve fatigue strength.

In the preferred embodiments according to the present invention, the pulse energy of the laser beam is established to the range of 1 mJ-10 J for the following reason. In the method according to aspects of the present invention, the laser-peening is followed by removal of a part of steel from the surface, thus, if the depth to which compressive stress is introduced by the laser-peening is small, the residual compressive stress at the new surface exposed by the removal is liable to be small. The depth of compressive stress introduction is shallower in proportion as the pulse energy is smaller. This is because the three-dimensional dispersion of the laser pulse energy introduced from the workpiece surface is greater in proportion as the pulse energy is smaller. In view of this constraint, processing is preferably conducted at a pulse energy of 1 mJ or greater in the method of the present invention. Considering the cross-sectional area of a laser beam that can be passed through the rail pipe and the optical damage threshold of the optical elements, the upper limit of the pulse energy is preferably set to 10 J or less.

The regions requiring laser-peening and steel removal depend on component design factors such as (i) the tensile stress distribution of the branch hole opening peripheral zone during fluctuating internal pressure load and (ii) the degree to which stress concentration is to be relaxed. Tensile stress distribution depends on the steel strength, the operating pressure, the rail hole 5 diameter "$d_1$", and the branch hole 6 diameter "$d_2$". While the distribution can be estimated based on finite element analysis or the like, a general processed region guideline will be given hereinafter.

After the laser-beam processing and ensuing removal processing, the maximum tensile stress of the branch hole opening peripheral zone 23 under fluctuating internal pressure load during actual use occurs in the vicinity of a region of the longitudinal cross-section of the rail hole 5 including the axes of branch holes 6 that is near the connection region between branch hole inner surface 21 and the surface subjected to removal processing. The principal stress direction is the peripheral direction of the rail hole 5. In order to improve fatigue strength, high compressive stress is preferably introduced with respect to the region represented by Formula (2) and (2') below, which includes the point where the tensile stress assumes maximum value.

Distance from center of branch hole≤Diameter of branch hole×0.6    Formula (2)

Angle between line segment drawn toward the center of a branch hole at an inner surface of a rail hole and the longitudinal direction of rail hole≤10°    Formula (2')

Figure 11:
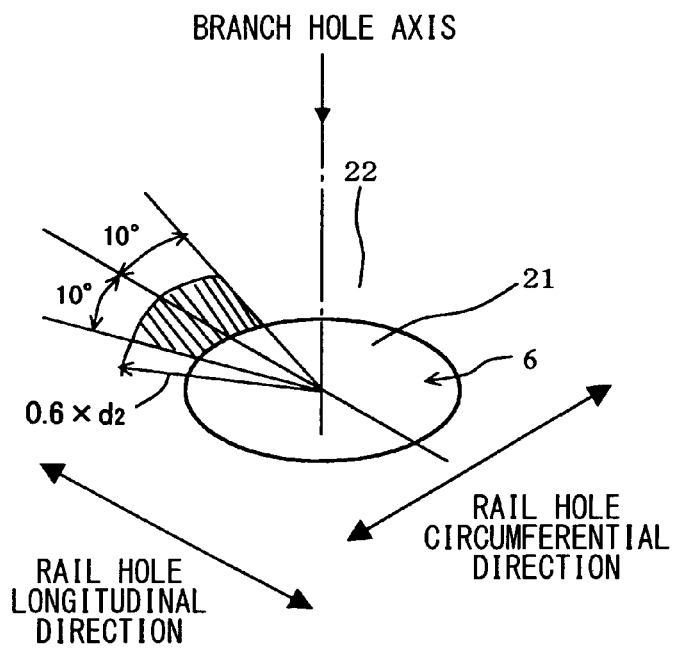
FIG. 11 is a perspective view showing a branch hole opening peripheral zone.

Therefore, the laser-beam processing region of the inner surface 22 of the rail hole 5 preferably includes the region represented by Formula (2) and Formula (2') shown in FIG. 11.

Figure 12:
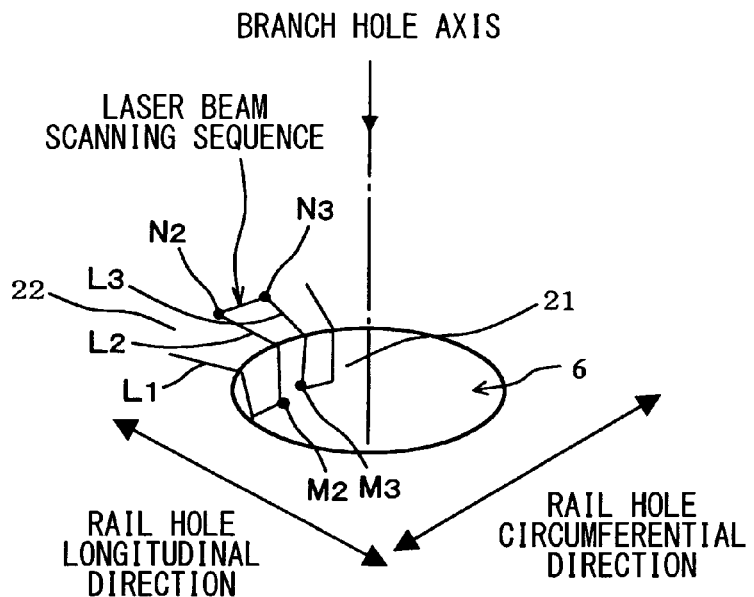
FIG. 12 is an explanatory diagram showing a laser beam irradiation method for irradiating a branch hole opening peripheral zone.
Figure 13:
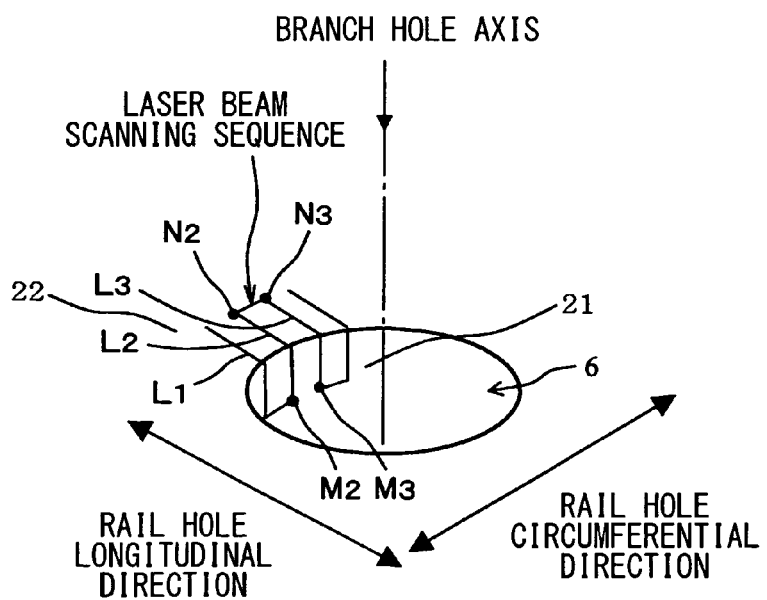
FIG. 13 is an explanatory diagram showing another laser beam irradiation method for irradiating a branch hole opening peripheral zone.

Further, in order to maximize fatigue strength, the compressive stress in the circumferential direction of the rail hole 5, which is the principal stress direction of the portion where repeated load stress is largest during use, must be maximized. A method of laser-beam spot superimposition effective for this purpose is shown in FIG. 12. Thus, the beam spot is scanned within a plane including the central axis of the branch hole 6, and the beam spot scanning is conducted multiple times while shifting the position thereof in the circumferential direction of the branch hole 6. This method makes use of the fact that, if the processing is conducted by the method shown in FIG. 10, stress is selectively strengthened in the Y direction of FIG. 10, as shown in FIG. 7. It should be noted that scanning direction need not be limited to within a plane including the axis of the branch hole 6. For example, the same effect can be obtained by, as shown in FIG. 13, scanning the beam spot within a plane including the longitudinal direction of the rail hole 5 and the longitudinal direction of the branch hole 6 so as to scan the beam spot multiple times while shifting the scanning in the circumferential direction of the rail hole 5.

Moreover, when a part of steel is removed for the purpose of imparting a relatively large compressive stress on a steel surface by eliminating a surface layer where stress was shifted toward the tensile side by melting and resolidification owing to the laser-beam irradiation, it is also preferable in this case to include the regions represented by Formula (2) and Formula (2').

Figure 14:
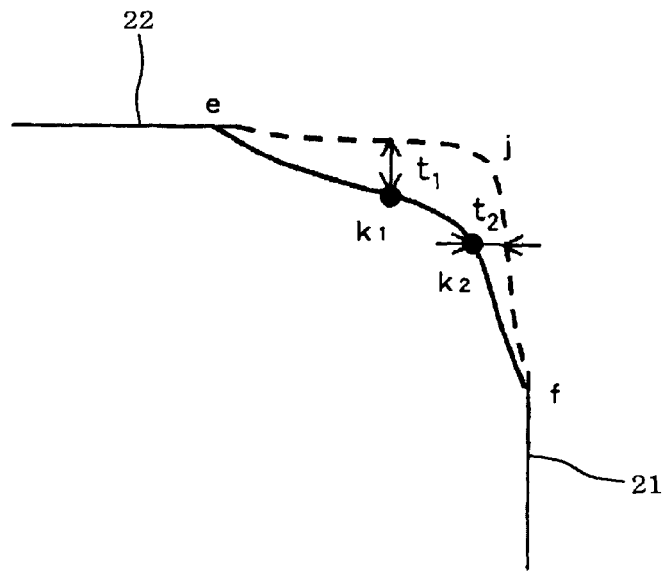
FIG. 14 is a cross-sectional view showing a state before and after removing steel from a branch hole opening peripheral zone.

Next, the thickness of steel removal in the removal process will be considered. As set out in the following, removal thickness with respect to points on the surface after removal is defined in this specification. To define the removal thickness for a given point on the surface after removal, the point on the surface before removal whose distance from the given point on the surface after removal is smallest is found and that distance is defined as the removal thickness. Explanation will be made taking the branch hole cross-sectional view of FIG. 14 as an example. In the drawing, the broken line curve "ejf" is the line before removal, and the curve from "e" through "$k_1$" and "$k_2$" to "f" is the line after removal. By the foregoing definition, the removal thickness at the line "$k_1$" point after removal is indicated as "$t_1$", and the removal thickness at the "$k_2$" point is indicated as "$t_2$". Although the explanation was made using a two-dimensional cross-section as an example, the actual removal thickness is defined by viewing the before/after removal lines considered in FIG. 14 as planes in three-dimensional space.

It is effective to control the removal thickness within the laser-peened region to fall within the following range. First, in order to remove a part of steel near a surface layer whose stress was shifted toward the tensile side by melting and resolidification owing to laser-beam irradiation, the removal thickness at points of the surface after removal is controlled to be 0.01 mm or greater. On the other hand, as shown in FIG. 7, compressive stress introduced by laser-peening tends to diminish with increasing depth from the surface. For example, from the depth distribution of Y direction stress in FIG. 7, it can be expected that removing steel to a depth from the surface of around 0.1 mm or more will actually cause the stress of the surface after removal to become smaller than that before removal. The attenuation of compressive stress in the depth direction can be mitigated by increasing the pulse energy. (The data of FIG. 7. was obtained at a pulse energy of 200 mJ.) Although a large removal thickness can be achieved by increasing pulse energy, keeping the removal thickness to around 0.3 mm or less is effective.

Figure 15:
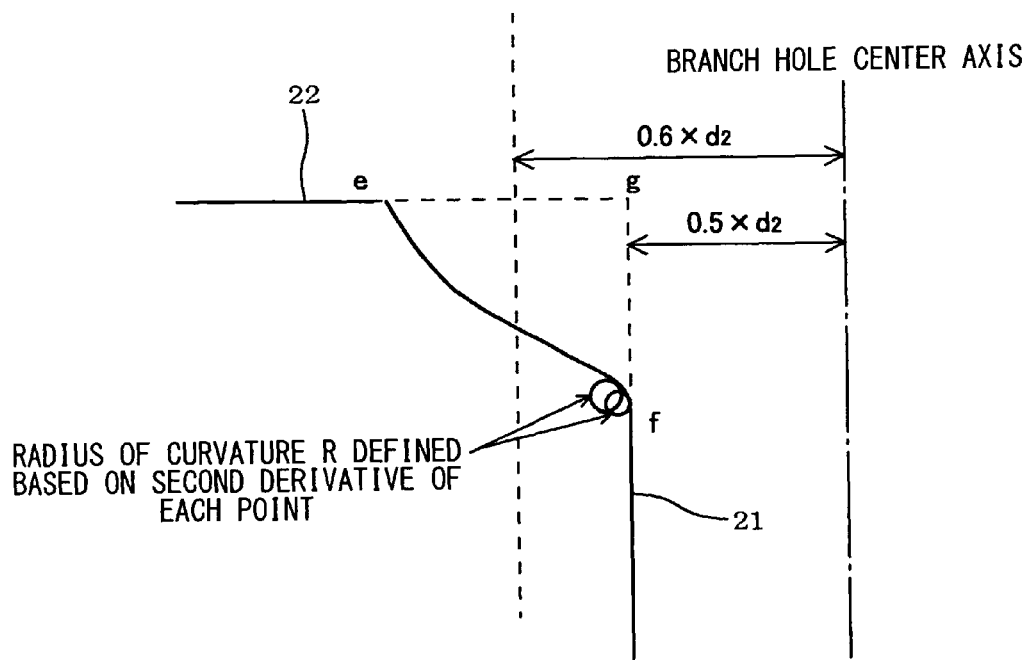
FIG. 15 shows a cross-sectional shape of a branch hole opening peripheral zone.

Steel removal not only is effective for eliminating a region near the surface layer whose stress was shifted toward the tensile side by melting and resolidification owing to laser-beam irradiation but also is effective for relaxing a stress concentration factor by changing the opening periphery shape. For fatigue strength improvement, the surface after removal must be smooth so as to avoid concentration of stress at the portion where the tensile stress of the branch hole opening peripheral zone becomes greatest under a fluctuating internal pressure load during use. From this viewpoint, the radius of curvature of the shape line at the opening peripheral zone of the branch hole viewed in a cross-section extending in the longitudinal direction of the rail hole and including the center axis of the branch hole is preferably 15 μm or greater at points of the region satisfying Formula (3). Further, this radius curvature R definition is illustrated in FIG. 15

Diameter of branch hole×0.5≤Distance from center of branch hole≤Diameter of branch hole×0.6  Formula (3)

The foregoing was explained about a method in which laser-beam irradiation is conducted solely from the inner surface 22 of the rail hole 5 in FIG. 6. However, it is also effective for increasing fatigue strength to conduct laser-beam irradiation both from the inner surface 21 of the branch hole 6 (diameter: "$d_2$") and from the inner surface 22 of the rail hole 5. The reason for this will be explained hereinbelow. As shown in FIG. 7, the absolute value of the compressive stress imparted by laser-peening decreases with increasing depth. Therefore, when only the inner surface 22 of the rail hole 5 is laser-peened, the absolute value of the compressive stress at portions farther from the inner surface 22 of the rail hole 5, e.g., "$g_2$" point in FIG. 6, sometimes becomes smaller than that at the surface layer. On the other hand, after removal of steel of the opening peripheral zone 23, the repeated load stress during actual use usually becomes greatest in the vicinity of this "$g_2$" point. When laser-peening is conducted both from the inner surface 21 of the branch hole 6 and from the inner surface 22 of the rail hole 5, the total compressive stress introduced is the sum of that introduced from the individual walls. The absolute compressive stress at the "$g_2$" point can therefore be raised to achieve higher fatigue strength.

Figure 16:
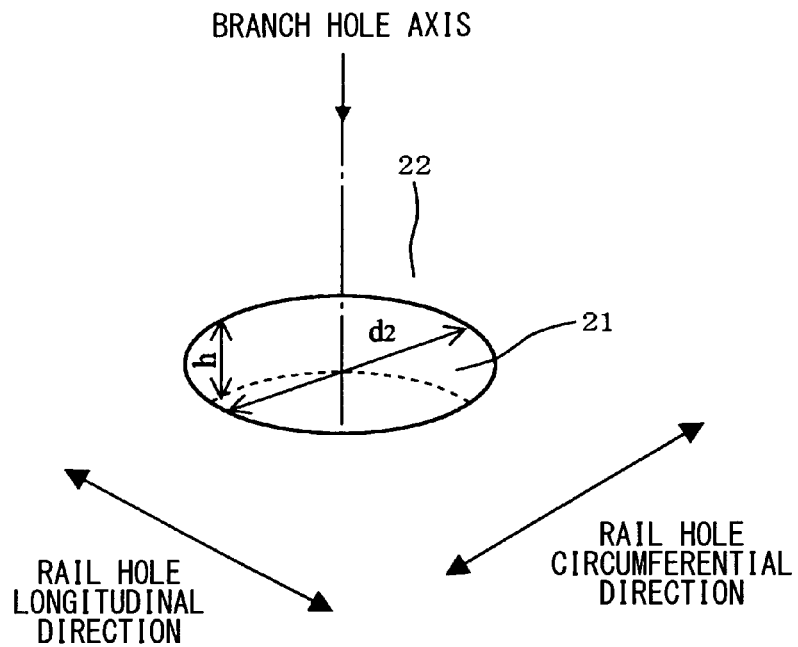
FIG. 16 is a perspective view showing a laser-beam processing region in a branch hole opening peripheral zone.

When the inner surface 21 of the branch hole 6 is also laser-peened, the depth "h" of the processing range shown in FIG. 16 is adequate if set at around 20% of the rail hole diameter "$d_1$", where height is measured with reference to the circle formed by the intersection of the rail hole inner surface 22 and the branch hole inner surface 21. In order to process deep portions of the branch hole inner surface 21, the incidence angle of the laser beam on the branch hole inner surface 21 should be made large. For a laser beam of any given peak power, the peak power density at the irradiation spot decreases with increasing incidence angle. As a result, when the diameter "$d_2$" is small, the depth "h" is usually governed by the limit to which irradiation is possible at a suitable peak power density.

On the other hand, the method of conducting laser beam irradiation solely from the inner surface 22 of the rail hole 5 has the advantage of enabling use of simple equipment because no mirror tilting mechanism is required for processing the inner surface 21 of the branch hole 6.

Figure 17:
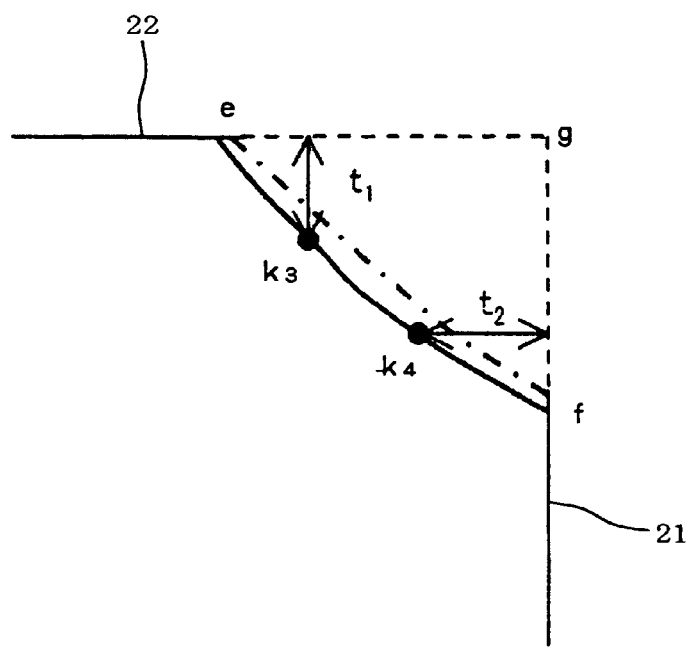
FIG. 17 is a cross-sectional view showing a state after removing a steel, in a case where a branch hole opening peripheral zone is chamfered.

In the second embodiment of the method for the locally reinforcement of the present invention, after the branch holes 6 have been formed, the opening peripheral zone 23 of each branch hole 6 is chamfered to a predetermined degree by polishing or machining, and then, the opening peripheral zone 23 is laser peened. After laser peening, the steel of the laser-peened opening peripheral zone 23 is removed. This makes it possible to obtain a common rail with enhanced fatigue strength at opening peripheral zone 23. This is mainly for the purpose of mitigating the stress concentration factor and is particularly effective in the case where the product design calls for considerable thickness removal between the time the branch hole 6 is formed and the time it reaches its final processed shape. FIG. 17 is a schematic diagram illustrating an example of implementing the second embodiment. The corner "egf" indicated by the dashed line in the drawing indicates the cross-sectional shape at the time of hole formation, the chain line indicates the cross-sectional shape after chamfering, and the solid line extending from "e" through "$k_3$" and "$k_4$" to "f" indicates the final processed cross-sectional shape obtained after laser-peening and steel removal have been conducted. When the aforesaid first embodiment is employed in a case where the removal thicknesses between the time of hole formation and the time when the final processed shape is reached, as exemplified by the thicknesses "$t_1$" and "$t_2$" shown in the drawing, exceed 0.3 mm, laser-peening is conducted from the surface of the corner "egf" indicated by the dashed line in the drawing and the final processed shape (curve "$ek_3k_4f$" in FIG. 17) is thereafter obtained by removal of steel. Since the steel removal thickness exceeds 0.3 mm in this case, the residual compressive stress at the surface of the final processed shape obtained after steel removal becomes small, as was pointed out earlier. In contrast, when the second embodiment as explained above is utilized, laser-peening is conducted after chamfering to the cross-sectional shape indicated by the chain line in FIG. 17.

As a result, the steel removal thickness following laser-peening is small. This has the advantage of enabling large compressive stress to be obtained at the surface of the final processed shape (curve "ek$_3$k$_4$f" in FIG. 17).

Chamfering conducted before laser-peening is done for the purpose of mitigating the stress concentration factor of tensile stress acting on the branch hole opening peripheral zone in the course of fluctuating internal pressure load during actual use. It is therefore effective to conduct the chamfering to include the region near where this stress is maximum, i.e., the region represented by the aforesaid Formula (2) and Formula (2'). Although the chamfering mitigates stress concentration at the branch hole 6 opening peripheral zone, the maximum value of the stress distribution remains in the vicinity of a region of the longitudinal cross-section of the rail hole 5 including the central axis of the branch hole 6 that is near the connection region between a branch hole inner surface and the surface subjected to removal processing. Therefore, the region where the branch hole opening periphery is thereafter laser-peened and the region from which steel is removed for the purpose of eliminating a surface layer where stress was shifted toward the tensile side by melting and resolidification owing to the laser-beam irradiation are also preferably selected to include the region represented by Formula (2) and Formula (2'). The thickness removed at the laser-peened region is preferably controlled to between 0.01 mm and 0.3 mm. From the viewpoint of minimizing reduction of compressive stress of the surface from which steel was removed, it is advantageous to perform the chamfering conducted prior to laser-peening to near the final processed shape because this enables the removal thickness after the laser-peening to be held to a small value of 0.1 mm or less, which is the particularly preferable range.

Common rails are usually made of high-strength steel. The transparent liquid provided at the laser-beam irradiated surface is therefore preferably one that does not promote rusting, such as alcohol (methyl or ethyl alcohol) or the like. Alternatively, in order to protect a common rail from rusting, a liquid prepared by adding methyl alcohol and ethyl alcohol to water in desired proportions or by adding a rust inhibitor to pure water, tap water or mineral water may be used. A commercially available rust inhibitor can be used, however, if a colored inhibitor is used, the density of the inhibitor should be adjusted in the range where laser beam can penetrate in water colored by the inhibitor. As explained above, it becomes now possible to provide an inexpensive common rail capable of withstanding ultrahigh pressures of 2000 atm or greater with capacity to spare, by assembling steel members having 600 MPa class strength using the low-cost liquid phase diffusion bonding process and performing laser-peening around the branch holes where the maximum principal stress is applied under internal pressure load for eliminating the fatigue fracture which originates from inclusions that are unavoidable in a high-strength steel.

In the present invention, in addition to the above-mentioned chemical components, it is possible to further contain one or more of 0.01-2.0% of Ni, 0.01-1.0% of Co, 0.01-1.0% of Cu, and 0.01-2.0% of W, or further contain one or more of 0.001-0.05% of Zr, 0.001-0.05% of Nb and 0.001-0.5% of V, or further contain one or more of sulfide shape control elements selected from among 0.0005-0.005% of Ca, 0.0005-0.005% of Mg, 0.0005-0.005% of Ba, and rare earth elements selected from among 0.001-0.05 of Y %, 0.001-0.05% of Ce, and 0.001-0.05% of La.

If these alloying components are contained in the steel, the content ranges of them are limited for the following reasons. Ni, Co and Cu are all γ stabilizing elements and are elements that improve hardenability by lowering the steel transformation point and thus promoting low-temperature transformation. If content of Ni, Co or Cu is 0.01% or greater, the above effect can be obtained. In contrast, if the content of Ni exceeds 2.0%, or the content of Co or Cu exceeds 1.0%, increased residual γ affects steel toughness. The content ranges are therefore preferably defined as 0.01-2.0% of Ni, and 0.01-1.0% of each of Co and Cu. However, as all three elements are expensive, their contents are preferably controlled to 0.05-1.0% of Ni, and 0.05-0.5% of Co and Cu from the viewpoint of industrial production.

W is an α stabilizing element which demonstrates a significant solute effect. This effect is observed at a content of 0.01% or above. However, if W is included in excess of 2%, it degrades joint toughness by forming boride and phosphide with B and P, which are liquid phase diffusion bonding diffusion elements. The upper limit of the W content is therefore set to 2.0%. However, taking grain boundary segregation into consideration, the upper content limit is preferably set to 1.0%.

Zr, Nb, and V precipitate fine carbides and thereby increase the strength of the steel. Each exhibits this effect at a content of 0.001% or above. Meanwhile, when either Zr or Nb is included at a content of 0.05% or above, or V is included to a content of 0.5% or above, carbide coarsening may degrade toughness. Therefore, the upper limit of the Zr or Nb content is set to 0.05% and the upper limit of the V content is set to 0.5%. Especially to avoid formation of boride or phosphide at the grain boundaries, the upper limit of the Nb or Zr content is preferably set to 0.035% and the upper limit of V is preferably set to 0.3%.

Moreover, all of sulfide shape control elements of Ca, Mg and Ba, and rare earth elements of Y, Ce and La have high affinity for S present in the steel as impurities, and thus, they are effective for inhibiting formation of MnS, which affects steel toughness. To achieve this effect, a content of 0.0005% is required in the case of Ca, Mg or Ba, while a content of 0.001% is required in the case of Y, Ce or La due to their large atomic weights. Moreover, because when Ca, Mg or Ba is included in excess of 0.005%, each forms coarse oxides and reduces toughness, and when Y, Ce or La is included to a content of 0.05%, each also forms coarse oxides and reduces toughness in likewise, the content of each element is therefore set as its upper limit.

The foregoing chemical components can either be appropriately combined and added jointly or be added independently to impart various properties to the steel without impairing the effects of the present invention.

The process for producing the invention steel is not limited to the ordinary integrated steelmaking process by the "blast furnace"-"converter furnace" route and it is instead possible to apply the electric furnace method using a cold-iron resource or the converter production method. Moreover, production need not go through the continuous casting process route but can be conducted via the ordinary casting and forging process route. It suffices to satisfy the chemical component ranges and formulas set out in the present invention and it is possible to apply an expanded range of production methods with respect to the invention technology. The shape of the produced steel is arbitrary and necessary molding technologies can be implemented to shape the adopted members. In other words, it is possible to apply the effect of the invention technology broadly to steel plates, steel pipes, steel bars, wire rods, steel shapes and the like. Furthermore, since the steel of this invention is excellent in weldability and suitable for liquid phase diffusion bonding, it can be applied with no loss of the invention effects to fabricate a structure that includes a liquid phase diffusion bonded joint and is partially welded or used in combination with a welded structure.

The producing method of the common rail according to the embodiment of the present invention explained above may be described as follows.

That is, according to one embodiment of the present invention, a method of producing a common rail in which a rail hole is formed in a center region and a plurality of branch holes which extend to the rail hole are formed in a cylindrical wall region enclosing the rail hole, includes: using, as a common rail material, a steel used in liquid phase diffusion bonding at least including in mass %, 0.01-0.3% of C, 0.01-0.5% of Si, 0.01-3.0% of Mn, 0.0003-0.01% B, 0.001-0.01% of N, over 0.01-0.5% of Al, 0.01-0.05% of Ti, wherein P is limited to 0.03% or less, S is limited to 0.01% or less, O is limited to 0.01% or less, and the total content of grain boundary segregated embrittling elements of As, Sn, Sb, Pb, and Zn is limited to 0.015% or less, the balance including inevitable impurities and Fe, the TLB value represented by Formula (1) being 0.001% or more; conducting a liquid phase diffusion bonding with a load of 1 MPa or more for 30 seconds or more at a bonding temperature of 1000-1300° C., by using a Ni-based or Fe-based insert metal containing 1% or more of B; conducting laser-peening by irradiating a pulsed laser beam with respect to an inside surface of the branch hole located near an opening peripheral zone of the branch hole, and an inside surface of the rail hole, under the presence of a transparent liquid; and removing a part of steel from a surface layer of the opening peripheral zone for improving a fatigue strength at the opening peripheral zone.

Further, the common rail according to the embodiment of the present invention explained above may be described as follows. That is, according to the embodiment of the present invention, a common rail, in which a rail hole is formed in a center region and a plurality of branch holes which extend to the rail hole are formed in a cylindrical wall region enclosing the rail hole, is made from a material which is a steel used in liquid phase diffusion bonding at least including in mass %, 0.01-0.3% of C, 0.01-0.5% of Si, 0.01-3.0% of Mn, 0.0003-0.01% of B, 0.001-0.01% of N, over 0.01-0.5% of Al, 0.01-0.05% of Ti, wherein P is limited to 0.03% or less, S is limited to 0.01% or less, O is limited to 0.01% or less, and the total content of grain boundary segregated embrittling elements of As, Sn, Sb, Pb, and Zn is limited to 0.015% or less, the balance including inevitable impurities and Fe, the TLB value represented by Formula (1) being 0.001% or more, the opening peripheral zone of the branch hole having a shape in which a radius of curvature of a shape line at the opening peripheral zone of the branch hole viewed in a cross-section extending in a longitudinal direction of the rail hole and including a center line of the branch hole is 15 μm or greater at points of a region satisfying Formula (3), and a compressive stress in a direction perpendicular to a longitudinal direction of the rail hole in the cross-section being −200 MPa or greater.

Example 1

In the following, an explanation is made with regard to the results of internal pressure fatigue tests conducted by fabricating common rail prototypes for verifying the effects of the invention.

Figure 18A:
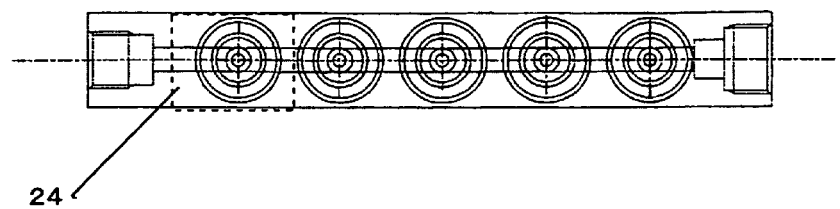
FIG. 18A is a plan view showing a test piece of a common rail.
Figure 18B:
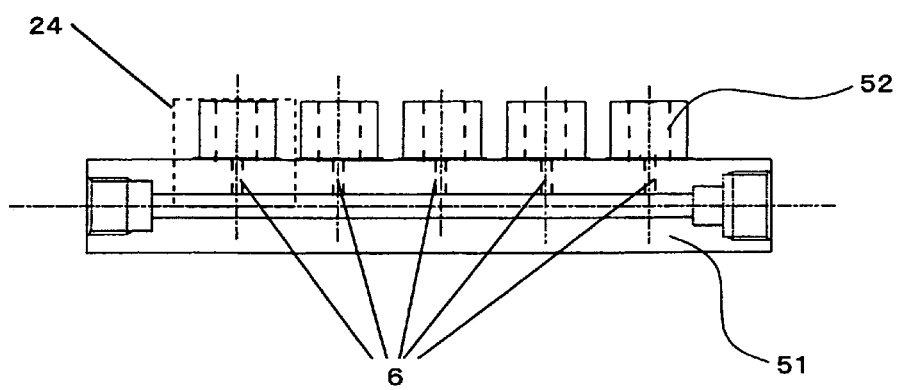
FIG. 18B is a front view showing the test piece of the common rail.
Figure 19:
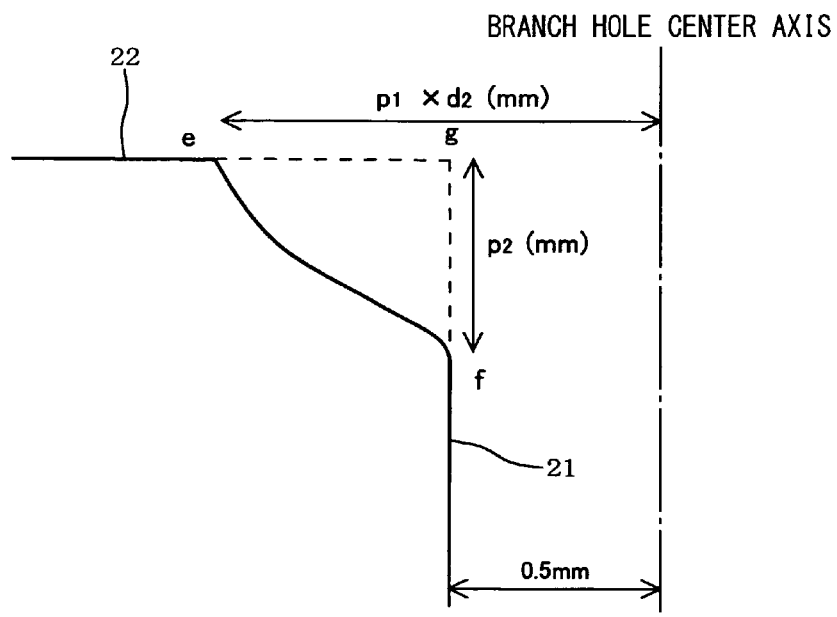
FIG. 19 is a cross-sectional view showing chamfer processing applied to a branch hole opening peripheral zone.

Common rails as illustrated in FIG. 18A and FIG. 18B were fabricated as follows. First, a common rail body 51 having a length of 230 mm, a width of 40 mm and a thickness of 30 mm, and holders 52 each having a height of 25 mm, an outside diameter of 24 mm and a thickness of 4 mm were fabricated. Utilizing laboratory scale vacuum-melting or practical steel plate production equipment, a steel having chemical components falling in the range according to the present invention was produced in an amount of 100 kg-300 ton by vacuum melting or ordinary "blast furnace"-"converter"-"secondary refinement"-"degassing/trace element addition"-"continuous casting"-"hot rolling" processes, and the steel was processed and shaped into the form shown in FIG. 18A and FIG. 18B to obtain the rail body 51 and the holder 52. Next, the rail body 51 was processed by: forming a 10 mm-diameter rail pipe extending through the center of the rail body in the longitudinal direction; forming guide grooves having a depth of 4 mm and a width of 7 mm for defining holder bonding locations; and forming 1 mm-diameter branch holes 6 directed toward the rail pipe at locations for holder bonding so that the branch holes 6 comes to lie along extensions of the holder axes. The holders 52 were formed on the inner surfaces with 2 mm high threads for fastening branch lines for fuel distribution. Next, the end faces of the bonding regions of the rail body 51 and each holder 52 were ground to Rmax<100 μm and degreased. Then, liquid phase diffusion bonding was performed for bonding a test piece formed by facing the end face pairs, by using a tension-compression testing machine equipped with a 150 kW output high-frequency induction heating unit. Here, a 20-50 μm thick Ni—B based or Fe—B based amorphous foil of which at least 50% by volume thereof was substantially amorphous, and which can be used for liquid phase diffusion bonding in a temperature of 1000-1300° C., was interposed between the bonding faces, and the liquid phase diffusion bonding was conducted by heating an entire test piece to a required bonding temperature under a stress of 1-20 MPa for from 30 seconds to 60 minutes, followed by spontaneous cooling. In some instances, the laser-peening explained below was preceded by chamfering of the edges of the rail pipe side ends of the branch holes 6 of the rail body 51. The chamfering was performed by applying electric current through a spherical projection operated under pressure to polish concentrically in a shape centered on the axis of the branch hole 6. The diameter of the projection and the electrolytic polishing time were varied to vary the width "$p_1$" and depth "$p_2$" of the chamfered region as shown in FIG. 19. Here, "$p_1$" represents a multiplying factor with respect to a branch hole diameter "$d_2$".

Figure 20:
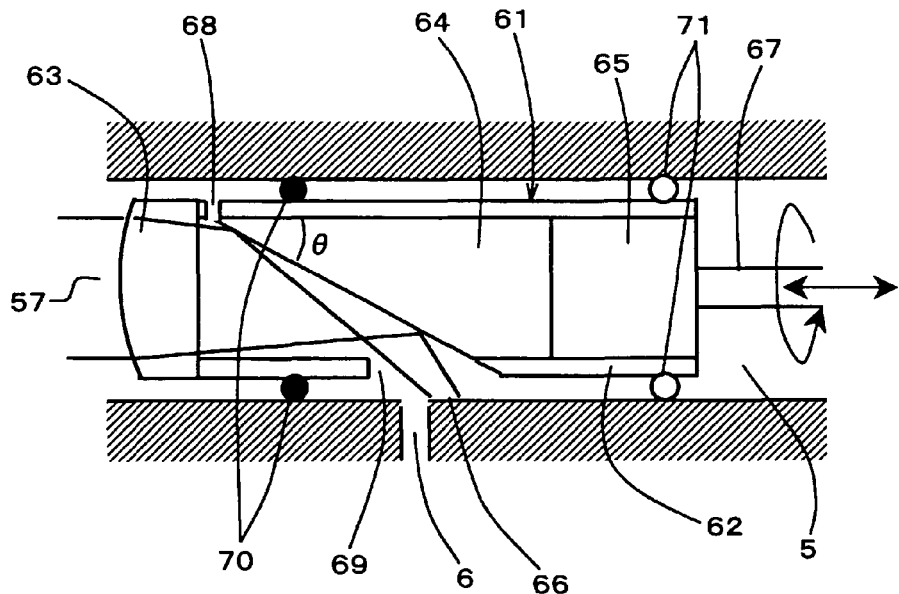
FIG. 20 is a cross-sectional view showing an irradiation head unit of a laser beam-processing apparatus.

The laser-peening was conducted with respect to the peripheral zone of the branch hole 6 opening on the rail pipe side. FIG. 20 shows a state in which an irradiation head unit 61 of a laser-beam processing apparatus used for the laser-peening was inserted into the rail hole 5. The irradiation head unit 61, which is supported by a supporting bar 67 movable in a longitudinal direction of the rail hole 5 and rotatable about the center axis of the rail hole 5, is equipped with a focusing lens 63 and a mirror 64 mounted on a pipe 62. A numeral 71 represents a projection. In the configuration shown in FIG. 20, the mirror 64, which is a rod mirror having the shape of a cylinder cut diagonally, is adhered to a mirror seat 65. A laser beam 57 directed into the rail hole 5 of the common rail 1 is bent by the focusing lens 63 and reflected by the mirror 64, thereby reaching a focused spot 66. Since water is present on both sides of the focusing lens 63, the lens material is preferably one having a high refractive index to ensure adequate beam bending. The material should also be durable against a laser beam having a high peak power density. For these reasons, sapphire was used as the lens in this example. In order to prevent the mirror 64 from being contaminated by metal particles and plasma emanating from the laser beam irradiation spot, the pipe 62 is formed with a pair of cut-outs 68, 69, and a ring-shaped seal member 70 is provided to encircle the pipe 62. This seal member 70 functions to generate a water current passing from one cut-out 68 to the other cut-out 69 within the pipe 62 so as to protect the surface of the mirror 64 from contamination. As the laser beam, the second harmonic wave of an Nd:YAG laser (wavelength: 532 nm) or the second harmonic wave of an Nd:YVO$_4$ laser (wavelength: 532 nm) was employed because these beams have good water penetrating power. The pulse durations of the pulsed laser beams were 10 ns and 1 ns, respectively. The laser-beam processing was conducted while varying the pulse energy and the spot diameter. The Nd:YAG laser was used for processing conducted at a pulse energy of 10 mJ or greater, and the Nd:YVO$_4$ laser was used for processing conducted at a pulse energy of less than 10 mJ. The spot shape at the irradiation point was substantially circular and the peak power density was controlled to be 50 TW/m$^2$.

Figure 21:
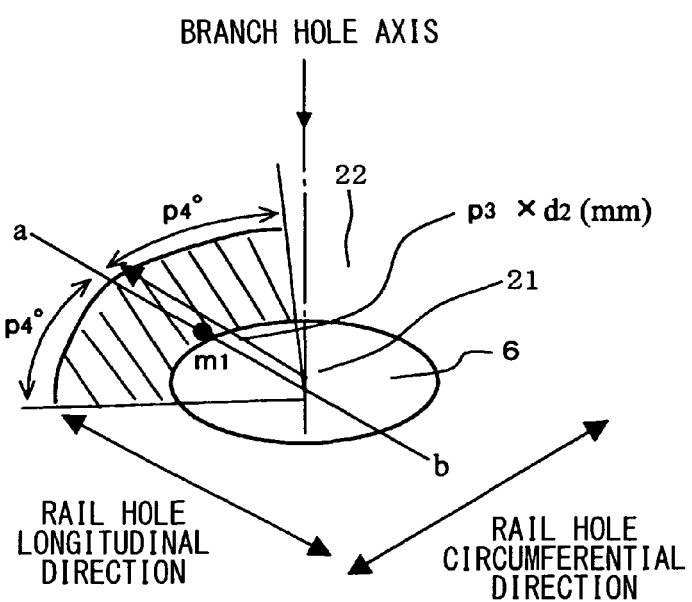
FIG. 21 is a cross-sectional view showing a laser beam irradiation method applied to a branch hole opening peripheral zone.

In order to increase compressive stress in the rail hole circumferential direction the beam spot was, as shown in FIG. 12, scanned within a plane including the center axis of the branch hole 6, and multiple scans were conducted while shifting the scanned beam spot in the peripheral direction of the branch hole 6. The laser-beam processed region was the region represented by Formulas (4) and (4'), and the processing was conducted while changing "$p_3$" and "$p_4$". The definitions of "$p_3$" and "$p_4$", and the processed region (shaded area), are indicated in FIG. 21.

$$\text{Distance from center of branch hole} \leq \text{Diameter of branch hole} \times p_3 \quad \text{Formula (4)}$$

$$\text{Angle between line segment drawn toward center of branch hole at inner surface of rail hole and longitudinal direction of rail hole} \leq p_4° \quad \text{Formula (4')}$$

The average number of times that a given spot was irradiated with the pulsed laser beam was set to 6.9. In FIG. 21, the laser-beam processing region on the side of "a" is only indicated for simplicity, however, in actual processing, the side of "b" which exists in the opposite side of "a" with respect to the branch hole was also processed in the same manner as the "a" side.

Figure 22:
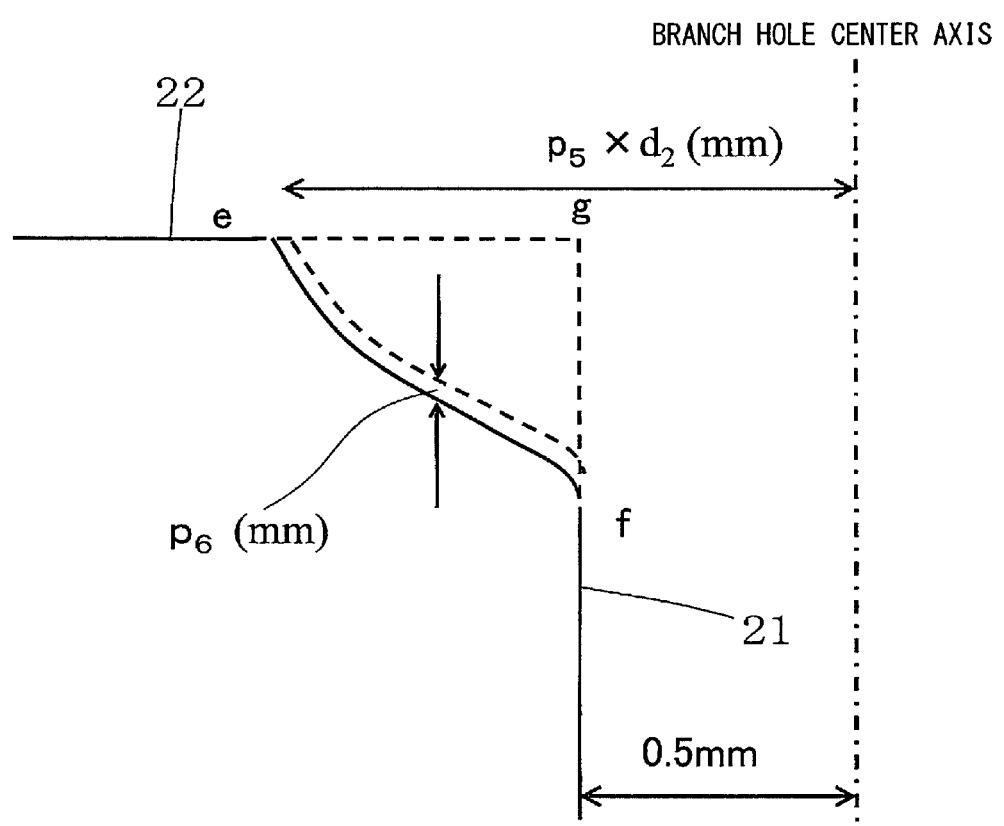
FIG. 22 is a cross-sectional view showing electrolytic polishing applied to a branch hole opening peripheral zone.

After laser-peening, the steel was removed by electrolytic polishing. Electric current was applied through a spherical projection operated under pressure to polish the steel concentrically with respect to the center axis of the branch hole 6. The diameter of the projection and the electrolytic polishing duration were varied to vary the width "$p_5$" (multiplying factor with respect to the branch hole diameter "$d_2$") and removal depth "$p_6$" of the electrolytic polished region, as shown in FIG. 22. The removal depth was defined as set out above with reference to FIG. 14. Further, the maximum radius of curvature "Rm" of the branch hole shape line at the region satisfying the foregoing Formulas (2) and (2') in the longitudinal cross-section of the rail hole including the center axis of the branch hole was evaluated. The parameters ("$p_1$", "$p_2$", "$p_5$", "$p_6$", "Rm") related to the opening region shape after electrolytic polishing in the embodiment explained above were measured by cutting common rails not subjected to fatigue testing to obtain the cross-section including the longitudinal direction of the rail hole and the center axis of the branch hole, polishing the cut surfaces, and observing their shapes with an optical microscope.

Each common rail fabricated by the aforesaid method was set in an internal pressure fatigue tester by means of an additional fabricated fastening jig attached to the tester, and the internal pressure test was conducted at a maximum injection pressure of 300 MPa, 15 Hz, and 10 million cycles. In the test, to simulate the use environment of an actual engine, screws for blocking the open ends of the holders were selected so that these screws were mated with the shapes of the threads formed on the inner surfaces of the holders, and then, these screws were driven in using a maximum torque of 3 tons.

Table 1 shows the fatigue test results. Table 2 shows steels having chemical components within amount ranges according to the present invention used in this examples, and Table 3 shows mechanical properties of each steel set out in Table 2. The numerals indicating chemical component conditions correspond to the conditions set out in Table 2. The measured residual stress "σA" in the rail hole circumferential direction at point m$_1$ in FIG. 21 is shown in Table 1. For the residual stress "σA" measurement, a portion 24 including one branch hole was cut from each common rail not subjected to the fatigue testing, as shown in FIG. 18A and FIG. 18B, and analysis was conducted using an x-ray residual stress analyzer. In order to extract the specimen without changing the residual stress introduced by the laser-peening, the cutting was performed at locations apart from the rail hole side opening of the branch hole 6. The length of the cut was 40 mm in the longitudinal direction of the rail hole and the cutting was done also in a plane perpendicular to the branch hole axis and including the rail hole axis. The x-ray stress measurement beam diameter was 0.1 mm. In Tables, TS indicates the tensile strength (kN/mm$^2$) of a liquid phase diffusion bonded joint at 25° C., CH indicates the absorption energy (J) in a Charpy test of a liquid phase diffusion bonded joint under 0° C., and ΔHv indicates the absolute value of the difference between the maximum hardness at a bonding region and the hardness value at a portion apart from the bonding region in 5 mm (the value obtained from a Vickers hardness test under a 100 g load).

[Table 1]
[Table 2]
[Table 3]

Set of Conditions 126 as shown in Table 1 is a prior art example in which laser-peening was conducted but no polishing was performed thereafter. Sets of Conditions 106, 108, 111, 114, 116 and 119 are comparative examples in which polishing was conducted after laser-peening but no significant effect over the prior art example was observed since the conditions are not within the range of the present invention as explained later. The remaining sets of conditions are examples according to the present invention. Under every set of conditions according to the present invention, an improvement in fatigue strength over the prior art example was observed.

Set of Conditions 106 is an example in which the fatigue strength improving effect was small because the pulse energy was deficient so that the depth region to which the compressive stress is introduced by the laser-peening was shallow and "σA" following electrolytic polishing was therefore small. On the other hand, sets of Conditions 101 to 105, in which the pulse energy was 1 mJ or greater, all exhibited fatigue strength improving effects.

Sets of Conditions 108 and 111 are examples in which the fatigue strength improving effect was small because the laser-beam processing region was too small so that the effect of reducing the tensile stress in the region of a large load during internal pressure fatigue testing was insufficient. On the other hand, sets of Conditions 107, 109 and 110, whose laser pulse energy conditions were the same as those of sets of Conditions 108 and 111 and in which $p_3 \geq 0.6$ and $p_4 \geq 10°$, all exhibited fatigue strength improving effect. That is, the laser-beam processing region is preferably selected so as to include a region represented by the foregoing Formula (2) and Formula (2').

A set of Conditions 114 is an example in which the fatigue strength improving effect was small because the electrolytic polishing was too small so that the effect of reducing the stress concentration factor in the region of large load during internal pressure fatigue testing was insufficient. The result shows that even though electrolytic polishing was conducted, "Rm" was not much different from that of set of Conditions 126, which is a prior art example. On the other hand, sets of Conditions 103, 112 and 113, whose laser pulse energy conditions were the same as those of set of Conditions 114 and in which "$p_5$"≥0.6, all exhibited fatigue strength improving effects.

A set of Conditions 116 is an example in which the fatigue strength improving effect was small because the electrolytic polishing thickness of 0.4 mm was large, so that the depth region to which compressive stress was introduced by laser-peening was removed and "σA" following electrolytic polishing was therefore small.

A set of Conditions 119 is an example in which the fatigue strength improving effect was small because the electrolytic polishing thickness of 0.005 mm was small, so that the effect of eliminating a surface layer where stress was shifted toward the tensile side by melting and resolidification owing to the laser-beam irradiation was insufficient and, in addition, relaxation of stress concentration by the electrolytic polishing was also insufficient. The result shows that neither "Rm" nor "σA" differed substantially from those of a set of Conditions 126, which is a prior art example.

The present invention enables a major improvement in fatigue strength over the prior art by achieving an effect of increasing surface compressive stress together with a synergistic complementary effect of relaxing a stress concentration factor produced by shape modification. The test results show that it is effective for realizing the above effects to establish conditions of absolute value of "σA"≥200 MPa and "Rm"≥15 μm.

Table 4 shows steels having chemical components not within amount ranges according to the present invention, and Table 5 shows mechanical properties of each steel set out in Table 4. In these examples, liquid phase diffusion bonded joint properties and joint hardness uniformities are not achieved so that even though laser peening is conducted, resistibility to the inner pressure fatigue is lost in the steel itself or in the liquid phase diffusion bonded joint. Here, chemical components, liquid phase diffusion bonded joint properties, hardness uniformity indexes near the joint, and ΔHv (100 g) are shown for each of the steels. Laser peening was conducted under set of Conditions 122 described in Table 1.

[Table 4]
[Table 5]

Steel No. 51 is an example in which good liquid phase diffusion bonded joint toughness could not be obtained because the C content was excessive (the joint fatigue properties were inferior to those of the laser-peened branch hole opening region).

Steels No. 52 and 53 are examples in which the joint fatigue properties were inferior to those of the laser-peened branch hole opening regions because the Si content of the Steel No 52 and the Mn content of Steel No. 53 were excessive, so that joint toughness was reduced by formation of abundant complex oxides of MnO—$SiO_2$ at the liquid phase diffusion bonded joint.

Steel No. 54 is an example in which the joint fatigue properties were inferior to those of the laser-peened branch hole opening regions because excessive Ti addition degraded the joint toughness by causing the occurrence of abundant Ti-containing carbonitrides at the joint.

Steel No. 55 is an example in which the joint fatigue properties were inferior to those of the laser-peened branch hole opening regions because excessive Al addition caused the formation of coarse oxides in the steel and the liquid phase diffusion bonded joints and degraded the toughness, especially at the bonding region.

Steel No. 56 is an example in which the joint fatigue properties were inferior to those of the laser-peened branch hole opening regions because excessive Ti content caused the stress concentration in the vicinity of the joint due to the TLB value of less than 0.001 which cannot achieve uniform hardness in the bonding region.

Steel No. 57 is an example in which the joint fatigue properties were inferior to those of the laser-peened branch hole opening regions because short B addition caused the stress concentration in the vicinity of the joint due to the TLB value of less than 0.001 which cannot achieve the uniform hardness in the bonding region.

Steel No. 58 is an example in which the joint fatigue properties were inferior to those of the laser-peened branch hole opening regions because excessive B addition degraded toughness by causing an occurrence of B-containing carbides and borides at the joint.

Steel No. 59, Steel No. 60 and Steel No. 61 are examples in which the joint fatigue properties were inferior to those of the laser-peened branch hole opening regions because excessive Ni, Co, or Cu addition degraded the toughness of the bonded joint due to the abundant occurrence of residual γ.

Steel No. 62 is an example in which the joint fatigue properties were inferior to those of the laser-peened branch hole opening regions because excess W addition degraded the toughness due to the occurrence of abundant boride at the joint.

Steel No. 63 is an example in which the joint fatigue properties were inferior to those of the laser-peened branch hole opening regions because excessive V content degraded the toughness due to the occurrence of coarse V carbide at the bonded joint.

Steel No. 64 and Steel No. 65 are examples in which the joint fatigue properties were inferior to those of the laser-peened branch hole opening regions because excessive Zr or Nb content degraded the toughness due to the occurrence of the abundant corresponding carbides at the bonded joint.

Steel Nos. 66-68 are examples in which the joint fatigue properties were inferior to those of the laser-peened branch hole opening regions because the excessive Ca, Mg or Ba addition degraded the toughness of the bonded joint due to the occurrence of the corresponding oxides.

Steel Nos. 69-71 are examples in which the joint fatigue properties were inferior to those of the laser-peened branch hole opening regions because excessive Y, Ce or La addition degraded the toughness of the bonded joint due to the occurrence of the corresponding oxides.

Steel Nos. 72, 73, 74, and 75 are examples in which the joint fatigue properties were inferior to those of the laser-peened branch hole opening regions because the total addition of As+Sn+Sb+Pb+Zn exceeded 0.015% and joint toughness was degraded due to the grain boundary embrittlement.

Steel No. 76 and steel No. 77 are examples in which, though the chemical components were within the range of the present invention, the joint fatigue properties were inferior to those of the laser-peened branch hole opening regions because the stress is concentrated at the joint due to the TLB value of less than 0.001 which cannot achieve the uniform hardness in the bonding region, so that the value ΔHv (100 g) value exceeded 100.

INDUSTRIAL APPLICABILITY

The present invention can be used in producing a steel member such as a common rail for improving fatigue properties of mechanical parts through which fluid passes, at a portion where stress concentration easily occurs such as a region where the diameter varies sharply or an end region of a pipe.

[Brief Description of the Reference Symbols]

| | |
|---|---|
| 1 | common rail |
| 2 | cylindrical wall region |
| 5 | rail hole |
| 6 | branch hole |
| 7 | zone near opposite ends parallel to the longitudinal direction of the rail hole |
| 11 | common rail body |
| 12 | holder |
| 13 | pipe conduit |
| 14 | branch tube |
| 15 | alloy metal foil |
| 21 | inner surface (branch hole) |
| 22 | inner surface (rail hole) |
| 23 | opening peripheral zone |

[Brief Description of the Reference Symbols]

| | |
|---|---|
| 31 | laser beam generator |
| 32 | laser beam |
| 33 | focusing lens |
| 34 | optical window |
| 35 | water tank |
| 37 | test piece |
| 38, 39, 41 | support |
| 40, 42 | guide |
| 43 | scanner |
| 51 | rail body |
| 52 | holder |
| 57 | laser beam |
| 61 | irradiation head unit |
| 62 | pipe |
| 63 | focusing lens |
| 64 | mirror |
| 65 | mirror seat |
| 66 | focused spot |
| 67 | supporting bar |
| 68, 69 | cut-out |
| 70 | seal member |
| 71 | projection |

TABLE 1

| set of conditions | steel component conditions | chamfering conditions | | pulse energy (mJ) | beam diameter | $p_3$ | $p_4$(°) | electrolytic polishing conditions | | Rm (μm) | σA (MPa) | fatigue strength (MPa) |
|---|---|---|---|---|---|---|---|---|---|---|---|---|
| | | $p_1$ | $p_2$ (mm) | | | | | $p_5$ | $p_6$ (mm) | | | |
| 101 | 9  | no chamfering | | 1    | 0.05 | 0.7  | 30  | 0.7  | 0.05  | 23  | −385 | 232 |
| 102 | 12 | no chamfering | | 9    | 0.16 | 0.75 | 30  | 0.8  | 0.06  | 26  | −557 | 240 |
| 103 | 14 | no chamfering | | 30   | 0.3  | 1    | 30  | 1.0  | 0.05  | 31  | −604 | 243 |
| 104 | 13 | no chamfering | | 100  | 0.6  | 1.5  | 30  | 1.6  | 0.06  | 42  | −836 | 251 |
| 105 | 23 | no chamfering | | 500  | 1.3  | 2    | 30  | 1.6  | 0.07  | 40  | −849 | 252 |
| 106 | 20 | no chamfering | | 0.2  | 0.03 | 0.65 | 30  | 0.7  | 0.05  | 21  | −178 | 211 |
| 107 | 12 | no chamfering | | 0.8  | 0.03 | 0.8  | 20  | 0.7  | 0.05  | 20  | −182 | 210 |
| 108 | 12 | no chamfering | | 1    | 0.05 | 0.6  | 30  | 0.7  | 0.05  | 22  | −403 | 229 |
| 109 | 9  | no chamfering | | 1    | 0.05 | 0.55 | 30  | 0.7  | 0.05  | 18  | −169 | 213 |
| 110 | 12 | no chamfering | | 30   | 0.3  | 0.55 | 30  | 0.7  | 0.05  | 18  | −427 | 215 |
| 111 | 21 | no chamfering | | 1    | 0.05 | 0.7  | 20  | 0.7  | 0.05  | 26  | −370 | 230 |
| 112 | 13 | no chamfering | | 1    | 0.05 | 0.7  | 10  | 0.7  | 0.05  | 23  | −352 | 228 |
| 113 | 16 | no chamfering | | 1    | 0.05 | 0.7  | 5   | 0.7  | 0.05  | 20  | −192 | 215 |
| 114 | 13 | no chamfering | | 1    | 0.05 | 0.7  | 7.5 | 0.7  | 0.05  | 20  | −190 | 217 |
| 115 | 13 | no chamfering | | 30   | 0.3  | 1    | 30  | 0.7  | 0.05  | 23  | −577 | 239 |
| 116 | 12 | no chamfering | | 30   | 0.3  | 1    | 30  | 0.6  | 0.05  | 17  | −617 | 228 |
| 117 | 20 | no chamfering | | 30   | 0.3  | 1    | 30  | 0.56 | 0.05  | 12  | −628 | 224 |
| 118 | 14 | no chamfering | | 1    | 0.05 | 1    | 20  | 0.55 | 0.05  | 12  | −361 | 218 |
| 119 | 14 | no chamfering | | 30   | 0.3  | 1    | 30  | 1.0  | 0.20  | 68  | −304 | 227 |
| 120 | 23 | no chamfering | | 30   | 0.3  | 1    | 30  | 1.0  | 0.40  | 125 | −176 | 220 |
| 121 | 9  | no chamfering | | 30   | 0.3  | 1    | 30  | 1.0  | 0.35  | 90  | −195 | 220 |
| 122 | 12 | no chamfering | | 100  | 0.6  | 1.5  | 30  | 1.5  | 0.02  | 30  | −876 | 250 |
| 123 | 9  | no chamfering | | 100  | 0.6  | 1.5  | 30  | 1.5  | 0.01  | 20  | −639 | 245 |
| 124 | 13 | no chamfering | | 100  | 0.6  | 1.5  | 30  | 1.5  | 0.005 | 12  | −443 | 223 |
| 125 | 21 | no chamfering | | 100  | 0.6  | 1.5  | 30  | 1.5  | 0.007 | 12  | −420 | 220 |
| 126 | 20 | no chamfering | | 1000 | 0.6  | 1.5  | 30  | 1.3  | 0.30  | 123 | −487 | 234 |
| 127 | 21 | no chamfering | | 100  | 0.6  | 1.5  | 30  | 0.7  | 0.05  | 25  | −843 | 247 |
| 128 | 13 | 1.300 | 0.300 | 100  | 0.6  | 1.5  | 30  | 1.2  | 0.05  | 112 | −846 | 268 |
| 129 | 16 | 0.700 | 0.200 | 100  | 0.6  | 1.5  | 30  | 0.9  | 0.05  | 88  | −850 | 262 |
| 130 | 12 | 0.630 | 0.150 | 100  | 0.6  | 1.5  | 30  | 0.8  | 0.05  | 70  | −838 | 256 |
| 131 | 23 | 0.560 | 0.050 | 100  | 0.6  | 1.5  | 30  | 0.7  | 0.05  | 25  | −824 | 248 |
| 132 | 13 | no chamfering | | 100  | 0.6  | 1.5  | 30  | no electrolytic polishing | | 8 | −414 | 222 |
| 133 | 21 | no chamfering | | 50   | 0.3  | 1    | 10  | no electrolytic polishing | | 8 | −362 | 212 |

TABLE 2 steels according to the present invention (mass %)

| | C | Si | Mn | P | S | Ti | Al | N | B | O | Ni | Co | Cu |
|---|---|---|---|---|---|---|---|---|---|---|---|---|---|
| 1 | 0.199 | 0.358 | 1.12 | 0.0269 | 0.0028 | 0.029 | 0.032 | 0.0057 | 0.0018 | 0.0010 | | | |
| 2 | 0.245 | 0.027 | 0.78 | 0.0112 | 0.0045 | 0.040 | 0.031 | 0.0023 | 0.0014 | 0.0034 | | | |
| 3 | 0.243 | 0.401 | 0.27 | 0.0180 | 0.0047 | 0.028 | 0.033 | 0.0022 | 0.0050 | 0.0034 | | | |
| 4 | 0.116 | 0.052 | 1.85 | 0.0076 | 0.0052 | 0.032 | 0.032 | 0.0058 | 0.0015 | 0.0061 | | | |
| 5 | 0.123 | 0.213 | 1.07 | 0.0149 | 0.0004 | 0.034 | 0.028 | 0.0029 | 0.0044 | 0.0021 | | | |
| 6 | 0.223 | 0.260 | 2.10 | 0.0044 | 0.0012 | 0.016 | 0.031 | 0.0041 | 0.0006 | 0.0029 | | | |
| 7 | 0.084 | 0.405 | 1.16 | 0.0175 | 0.0048 | 0.022 | 0.029 | 0.0042 | 0.0031 | 0.0030 | | | |
| 8 | 0.124 | 0.225 | 2.04 | 0.0159 | 0.0040 | 0.034 | 0.026 | 0.0075 | 0.0040 | 0.0060 | | | |
| 9 | 0.228 | 0.175 | 2.15 | 0.0218 | 0.0039 | 0.024 | 0.016 | 0.0075 | 0.0020 | 0.0062 | | | |
| 10 | 0.012 | 0.165 | 0.06 | 0.0218 | 0.0051 | 0.037 | 0.017 | 0.0027 | 0.0037 | 0.0008 | | | |
| 11 | 0.213 | 0.023 | 0.12 | 0.0226 | 0.0022 | 0.039 | 0.011 | 0.0024 | 0.0023 | 0.0068 | | | |
| 12 | 0.037 | 0.102 | 0.48 | 0.0202 | 0.0013 | 0.023 | 0.017 | 0.0038 | 0.0026 | 0.0051 | 1.22 | | 0.45 |
| 13 | 0.011 | 0.182 | 1.31 | 0.0214 | 0.0022 | 0.010 | 0.016 | 0.0030 | 0.0014 | 0.0048 | | 1.20 | |
| 14 | 0.118 | 0.105 | 1.02 | 0.0251 | 0.0005 | 0.017 | 0.026 | 0.0030 | 0.0048 | 0.0047 | | | 0.42 |
| 15 | 0.040 | 0.123 | 2.23 | 0.0156 | 0.0051 | 0.022 | 0.045 | 0.0017 | 0.0031 | 0.0035 | | | |
| 16 | 0.215 | 0.393 | 2.00 | 0.0054 | 0.0043 | 0.026 | 0.018 | 0.0019 | 0.0020 | 0.0037 | 0.45 | 1.19 | 0.39 |
| 17 | 0.196 | 0.282 | 0.89 | 0.0064 | 0.0011 | 0.023 | 0.019 | 0.0041 | 0.0048 | 0.0062 | | | |
| 18 | 0.019 | 0.197 | 1.29 | 0.0064 | 0.0038 | 0.027 | 0.016 | 0.0036 | 0.0005 | 0.0068 | | | |
| 19 | 0.085 | 0.393 | 1.41 | 0.0060 | 0.0053 | 0.039 | 0.013 | 0.0053 | 0.0026 | 0.0008 | 0.36 | | |
| 20 | 0.105 | 0.013 | 2.50 | 0.0047 | 0.0047 | 0.021 | 0.018 | 0.0052 | 0.0007 | 0.0055 | | | 0.36 |
| 21 | 0.011 | 0.346 | 0.30 | 0.0214 | 0.0046 | 0.017 | 0.019 | 0.0068 | 0.0005 | 0.0043 | | | |
| 22 | 0.064 | 0.321 | 0.34 | 0.0218 | 0.0006 | 0.022 | 0.026 | 0.0053 | 0.0003 | 0.0040 | 1.81 | | |
| 23 | 0.156 | 0.191 | 0.19 | 0.0223 | 0.0024 | 0.028 | 0.024 | 0.0034 | 0.0048 | 0.0055 | | | 0.36 |
| 24 | 0.068 | 0.131 | 1.67 | 0.0107 | 0.0040 | 0.019 | 0.022 | 0.0070 | 0.0020 | 0.0035 | | | |
| 25 | 0.197 | 0.044 | 0.55 | 0.0109 | 0.0029 | 0.035 | 0.013 | 0.0034 | 0.0030 | 0.0069 | 0.26 | | |
| 26 | 0.021 | 0.047 | 0.57 | 0.0147 | 0.0018 | 0.025 | 0.012 | 0.0030 | 0.0018 | 0.0054 | | | |
| 27 | 0.231 | 0.357 | 2.30 | 0.0090 | 0.0026 | 0.014 | 0.018 | 0.0078 | 0.0006 | 0.0057 | | 0.07 | | steels according to the present invention (mass %)

| | W | V | Zr | Nb | Ca | Mg | Ba | Y | Ce | La | As + Sn + Sb + Pb + Zn |
|---|---|---|---|---|---|---|---|---|---|---|---|
| 1 | | | | | | | | | | | 0.0125 |
| 2 | | | | | | | | | | | 0.0141 |
| 3 | | | | | | | | | | | 0.0116 |
| 4 | | | | | | | | | | | 0.0071 |
| 5 | | | | | | | | | | | 0.0088 |
| 6 | | | | | | | | | | | 0.0066 |
| 7 | | | | | | | | | | | 0.0079 |
| 8 | | | | | | | | | | | 0.0081 |
| 9 | | | | | | | | | | | 0.0044 |
| 10 | | | | | | | | | | | 0.0099 |
| 11 | | | | | | | | | | | 0.0036 |
| 12 | | | | | | | | | | | 0.0121 |
| 13 | | | | | | | | | | | 0.0116 |
| 14 | | | 0.022 | | | | | | | | 0.0113 |
| 15 | 0.56 | | | | | | | | | | 0.0098 |
| 16 | 0.81 | 0.245 | | | | | | | | | 0.0094 |
| 17 | | 0.112 | 0.006 | | | | | | | | 0.0071 |
| 18 | | | | 0.012 | | | | | | | 0.0075 |
| 19 | 0.99 | 0.165 | 0.019 | | 0.0028 | | | | | | 0.0069 |
| 20 | | 0.185 | | | | 0.0033 | | | | | 0.0049 |
| 21 | | | | 0.015 | 0.0033 | | 0.0026 | | | | 0.0081 |
| 22 | 0.44 | 0.148 | | | | 0.0029 | | 0.0070 | | | 0.0099 |
| 23 | | | | 0.003 | 0.0016 | | 0.0018 | | 0.0263 | | 0.0098 |
| 24 | | 0.562 | | | | | | 0.0166 | | 0.0223 | 0.0096 |
| 25 | 1.65 | | 0.038 | 0.041 | 0.0019 | | 0.0016 | | 0.0185 | | 0.0091 |
| 26 | 1.89 | | | 0.033 | | 0.0035 | | | | 0.2630 | 0.0055 |
| 27 | | 0.452 | | | 0.0045 | | | 0.0421 | 0.0062 | | 0.0144 |

TABLE 3 mechanical properties

| No. | TLB | TS | CH | ΔHv (100 g) |
|---|---|---|---|---|
| 1 | 0.0248 | 723 | 169 | 21 |
| 2 | 0.0307 | 781 | 172 | 11 |
| 3 | 0.0311 | 806 | 182 | 38 |
| 4 | 0.0256 | 788 | 155 | 10 |
| 5 | 0.0266 | 806 | 143 | 41 |
| 6 | 0.0173 | 790 | 165 | 18 |
| 7 | 0.0203 | 666 | 165 | 41 |
| 8 | 0.0205 | 634 | 133 | 17 |
| 9 | 0.0053 | 854 | 125 | 13 |
| 10 | 0.0150 | 826 | 182 | 38 |
| 11 | 0.0087 | 831 | 163 | 43 |
| 12 | 0.0094 | 1055 | 154 | 15 |

TABLE 3-continued

| | mechanical properties | | | |
|---|---|---|---|---|
| No. | TLB | TS | CH | ΔHv (100 g) |
| 13 | 0.0048 | 1061 | 126 | 19 |
| 14 | 0.0179 | 1093 | 135 | 37 |
| 15 | 0.0429 | 981 | 77 | 51 |
| 16 | 0.0119 | 999 | 81 | 14 |
| 17 | 0.0129 | 983 | 89 | 53 |
| 18 | 0.0077 | 826 | 315 | 46 |
| 19 | 0.0085 | 841 | 125 | 51 |
| 20 | 0.0068 | 855 | 152 | 22 |
| 21 | 0.0048 | 846 | 163 | 46 |
| 22 | 0.0134 | 671 | 144 | 36 |
| 23 | 0.0197 | 992 | 134 | 26 |
| 24 | 0.0093 | 681 | 182 | 23 |
| 25 | 0.0095 | 693 | 162 | 47 |
| 26 | 0.0059 | 661 | 144 | 10 |
| 27 | 0.0024 | 712 | 99 | 21 |

TABLE 4

| | steels according to comparative examples (mass %) | | | | | | | | | | | | |
|---|---|---|---|---|---|---|---|---|---|---|---|---|---|
| | C | Si | Mn | P | S | Ti | Al | N | B | O | Ni | Co | Cu |
| 51 | 0.363 | 0.060 | 1.37 | 0.0256 | 0.0045 | 0.025 | 0.059 | 0.0057 | 0.0029 | 0.0060 | | | |
| 52 | 0.175 | 0.660 | 1.05 | 0.0075 | 0.0023 | 0.032 | 0.012 | 0.0078 | 0.0039 | 0.0060 | | | |
| 53 | 0.043 | 0.243 | 3.45 | 0.0181 | 0.0011 | 0.032 | 0.025 | 0.0017 | 0.0007 | 0.0031 | | | |
| 54 | 0.243 | 0.353 | 1.63 | 0.0055 | 0.0019 | 0.115 | 0.022 | 0.0057 | 0.0042 | 0.0021 | | | |
| 55 | 0.106 | 0.110 | 2.19 | 0.0192 | 0.0010 | 0.013 | 0.521 | 0.0065 | 0.0015 | 0.0011 | | | |
| 56 | 0.093 | 0.168 | 1.98 | 0.0158 | 0.0015 | 0.025 | 0.019 | 0.0160 | 0.0008 | 0.0031 | | | |
| 57 | 0.151 | 0.093 | 0.07 | 0.0121 | 0.0003 | 0.016 | 0.015 | 0.0080 | 0.0002 | 0.0026 | | | |
| 58 | 0.133 | 0.316 | 2.01 | 0.0086 | 0.0013 | 0.013 | 0.059 | 0.0076 | 0.0160 | 0.0031 | | | |
| 59 | 0.093 | 0.204 | 1.17 | 0.0259 | 0.0038 | 0.035 | 0.029 | 0.0034 | 0.0047 | 0.0029 | 2.52 | | |
| 60 | 0.232 | 0.254 | 0.52 | 0.0268 | 0.0011 | 0.036 | 0.039 | 0.0039 | 0.0011 | 0.0065 | | 1.35 | |
| 61 | 0.255 | 0.398 | 0.59 | 0.0030 | 0.0008 | 0.017 | 0.044 | 0.0031 | 0.0051 | 0.0051 | 0.20 | | 1.18 |
| 62 | 0.205 | 0.294 | 0.43 | 0.0246 | 0.0047 | 0.025 | 0.021 | 0.0043 | 0.0015 | 0.0033 | | | |
| 63 | 0.218 | 0.227 | 1.89 | 0.0196 | 0.0004 | 0.023 | 0.029 | 0.0021 | 0.0022 | 0.0009 | | | |
| 64 | 0.074 | 0.323 | 2.02 | 0.0049 | 0.0044 | 0.039 | 0.029 | 0.0077 | 0.0026 | 0.0013 | | | |
| 65 | 0.169 | 0.187 | 1.76 | 0.0083 | 0.0020 | 0.019 | 0.036 | 0.0080 | 0.0022 | 0.0045 | 0.03 | 0.52 | 0.25 |
| 66 | 0.089 | 0.336 | 0.44 | 0.0037 | 0.0026 | 0.011 | 0.044 | 0.0017 | 0.0023 | 0.0043 | | | |
| 67 | 0.244 | 0.269 | 0.64 | 0.0157 | 0.0042 | 0.039 | 0.055 | 0.0058 | 0.0031 | 0.0058 | | | |
| 68 | 0.136 | 0.350 | 1.64 | 0.0178 | 0.0039 | 0.031 | 0.057 | 0.0050 | 0.0044 | 0.0049 | 0.56 | | |
| 69 | 0.031 | 0.175 | 1.26 | 0.0227 | 0.0003 | 0.034 | 0.019 | 0.0042 | 0.0011 | 0.0024 | | | |
| 70 | 0.149 | 0.053 | 2.21 | 0.0150 | 0.0036 | 0.015 | 0.037 | 0.0073 | 0.0006 | 0.0054 | | 0.71 | |
| 71 | 0.141 | 0.246 | 0.53 | 0.0142 | 0.0033 | 0.024 | 0.060 | 0.0063 | 0.0039 | 0.0064 | 0.44 | | |
| 72 | 0.145 | 0.244 | 0.02 | 0.0279 | 0.0030 | 0.033 | 0.019 | 0.0039 | 0.0031 | 0.0030 | | | 0.04 |
| 73 | 0.225 | 0.239 | 1.76 | 0.0092 | 0.0051 | 0.016 | 0.012 | 0.0057 | 0.0014 | 0.0006 | | 0.32 | |
| 74 | 0.100 | 0.287 | 2.38 | 0.0197 | 0.0011 | 0.018 | 0.013 | 0.0088 | 0.0032 | 0.0011 | | 0.15 | |
| 75 | 0.170 | 0.033 | 1.73 | 0.0064 | 0.0047 | 0.013 | 0.026 | 0.0021 | 0.0018 | 0.0006 | | | |
| 76 | 0.240 | 0.300 | 0.94 | 0.0263 | 0.0046 | 0.015 | 0.012 | 0.0065 | 0.0008 | 0.0069 | | | |
| 77 | 0.247 | 0.363 | 0.76 | 0.0097 | 0.0038 | 0.014 | 0.014 | 0.0074 | 0.0007 | 0.0064 | | | |

| | steels according to comparative examples (mass %) | | | | | | | | | | |
|---|---|---|---|---|---|---|---|---|---|---|---|
| | W | V | Zr | Nb | Ca | Mg | Ba | Y | Ce | La | As + Sn + Sb + Pb + Zn |
| 51 | | | | | | | | | | | 0.0125 |
| 52 | | | | | | | | | | | 0.0141 |
| 53 | | | | | | | | | | | 0.0116 |
| 54 | | | | | | | | | | | 0.0071 |
| 55 | | | | | | | | | | | 0.0088 |
| 56 | | | | | | | | | | | 0.0066 |
| 57 | | | | | | | | | | | 0.0079 |
| 58 | | | | | | | | | | | 0.0044 |
| 59 | | | | | | | | | | | 0.0099 |
| 60 | | | | | | | | | | | 0.0036 |
| 61 | | | | | | | | | | | 0.0121 |
| 62 | 2.88 | | | | | | | | | | 0.0116 |
| 63 | | 0.08 | | | | | | | | | 0.0113 |
| 64 | | | 0.070 | | | | | | | | 0.0098 |
| 65 | | | | 0.059 | | | | | | | 0.0094 |
| 66 | | | | 0.003 | 0.0067 | | | | | | 0.0071 |
| 67 | | | | 0.016 | | 0.0055 | | | | | 0.0075 |
| 68 | | | | 0.024 | | | 0.0055 | | | | 0.0069 |
| 69 | | | | | | | | 0.0680 | | | 0.0049 |
| 70 | | | | | | | | | 0.0710 | | 0.0081 |
| 71 | | | | | | 0.0028 | | | | 0.0980 | 0.0099 |
| 72 | | | | | 0.0039 | | 0.0022 | | | | 0.1921 |
| 73 | | | | | | | | | | | 0.0163 |
| 74 | | | | | | | | | | | 0.0172 |

TABLE 4-continued

| 75 | 0.040 |        | 0.0244 |
|----|-------|--------|--------|
| 76 |       |        | 0.0067 |
| 77 | 0.041 | 0.0016 | 0.0091 |

TABLE 5

| No. | mechanical properties | | | |
|-----|------|------|-----|-----------|
|     | TLB  | TS   | CH  | ΔHv (100 g) |
| 51 | 0.0645 | 622  | 23  | 65 |
| 52 | 0.0053 | 711  | 16  | 13 |
| 53 | 0.0192 | 775  | 11  | 14 |
| 54 | 0.0454 | 618  | 18  | 33 |
| 55 | 3.5452 | 913  | 26  | 3 |
| 56 | 0.0003 | 626  | 188 | 235 |
| 57 | 0.0006 | 489  | 263 | 189 |
| 58 | 0.0658 | 521  | 244 | 15 |
| 59 | 0.0283 | 732  | 23  | 18 |
| 60 | 0.0394 | 1040 | 16  | 43 |
| 61 | 0.0384 | 988  | 17  | 12 |
| 62 | 0.0120 | 1020 | 24  | 52 |
| 63 | 0.0217 | 964  | 16  | 92 |
| 64 | 0.0249 | 763  | 12  | 32 |
| 65 | 0.0228 | 804  | 8   | 71 |
| 66 | 0.0334 | 853  | 16  | 63 |
| 67 | 0.0686 | 842  | 21  | 44 |
| 68 | 0.0683 | 924  | 22  | 57 |
| 69 | 0.0124 | 866  | 25  | 80 |
| 70 | 0.0210 | 943  | 44  | 16 |
| 71 | 0.0666 | 1050 | 43  | 15 |
| 72 | 0.0145 | 821  | 16  | 71 |
| 73 | 0.0018 | 715  | 13  | 19 |
| 74 | 0.0022 | 683  | 18  | 21 |
| 75 | 0.0137 | 744  | 11  | 35 |
| 76 | 0.0004 | 729  | 155 | 152 |
| 77 | 0.0005 | 641  | 135 | 188 |

The invention claimed is:

1. A method of producing a common rail having a common rail body in which a rail hole and a branch hole which is formed in a cylindrical wall region enclosing the rail hole are formed, and a holder in which a communication hole communicating with the branch hole is formed, wherein the common rail body and the holder contain chemical components of
0.01-0.3 mass % of C,
0.01-0.5 mass % of Si,
0.01-3.0 mass % of Mn,
0.0003-0.01 mass % of B,
0.001-0.01 mass % of N,
over 0.01-0.5 mass % of Al,
0.01-0.05 mass % of Ti,
P limited to 0.03 mass % or less,
S limited to 0.01 mass % or less,
O limited to 0.01 mass % or less,
a total content of As, Sn, Sb, Pb, and Zn limited to 0.015 mass % or less, and
a balance including Fe and inevitable impurities,
in which a TLB value represented by Formula (1):

$$TLB = (B\%) - [(N\%)/1.3 - \{(Ti\%)/3.4 + (Al\%)/4.1\} \times (Al\%) \times 52]$$

is 0.001% or more,
the method comprising:
inserting a Ni-based or Fe-based insert metal having 1 mass % or more of B, between the common rail body and the holder;
performing liquid phase diffusion bonding so as to bond the common rail body, the insert metal, and the holder with a load of 1 MPa or more for 30 seconds or more at a bonding temperature of 1000-1300° C.;
performing laser-peening by irradiating a pulsed laser beam with respect to a boundary peripheral region between an inside surface of the branch hole located near an opening peripheral zone of the branch hole, and an inside surface of the rail hole, the boundary peripheral region being provided with transparent liquid; and
removing a surface layer of the opening peripheral zone, thereby increasing a fatigue strength of the opening peripheral zone.

2. The method of producing the common rail according to claim 1, wherein at least one of the common rail body and the holder further contains at least one of
0.01-2.0 mass % of Ni,
0.01-1.0 mass % of Co,
0.01-1.0 mass % of Cu, and
0.01-2.0 mass % of W.

3. The method of producing the common rail according to claim 1, wherein at least one of the common rail body and the holder further contains at least one of
0.001-0.05 mass % of Zr,
0.001-0.05 mass % of Nb, and
0.001-0.5 mass % of V.

4. The method of producing the common rail according to claim 1, wherein at least one of the common rail body and the holder further contains at least one of a sulfide shape control element and a rare earth element, the sulfide shape control element being selected from one or more of
0.0005-0.005 mass % of Ca,
0.0005-0.005 mass % of Mg, and
0.0005-0.005 mass % of Ba,
the rare earth element being selected from one or more of
0.001-0.05 mass % of Y,
0.001-0.05 mass % of Ce, and
0.001-0.05 mass % of La.

5. The method of producing the common rail according to any one of claims 1-4, wherein the removing of the surface layer of the opening peripheral zone is conducted by electrolytic polishing or fluid polishing.

6. The method of producing the common rail according to any one of claims 1-4, wherein a pulse energy of the pulsed laser beam is 1 mJ to 10 J.

7. The method of producing the common rail according to any one of claims 1-4, wherein a zone to which the laser-peening is performed and a zone from which the surface layer is removed incorporate a zone at the inner surface of the rail hole that satisfies Formula (2):

Distance from center of branch hole ≤ Diameter of branch hole × 0.6, and

Formula (2'):

Angle between line segment drawn toward center of branch hole at inner surface of rail hole and longitudinal direction of rail hole ≤ 10°, the thickness of the removed surface layer being 0.01-0.3 mm at the zone satisfying the Formula (2) and the Formula (2').

8. The method of producing the common rail according to any one of claims 1-4, wherein the removing of the surface layer of the opening peripheral zone causes a radius of curvature of a shape line at the opening peripheral zone of the branch hole viewed in a cross-section extending in a longitudinal direction of the rail hole and including a center line of the branch hole to be 15 μm or greater at points of a region satisfying Formula (3):

Diameter of branch hole×0.5≤Distance from center of branch hole≤Diameter of branch hole×0.6.

9. The method of producing the common rail according to any one of claims 1-4, wherein the opening peripheral zone is chamfered before conducting the laser-peening.

10. The method of producing the common rail according to claim 9, wherein a zone to be chamfered incorporates a zone satisfying the Formula (2) and the Formula (2').

11. The method of producing the common rail according to any one of claims 1-4, wherein the transparent liquid used in the laser-peening is alcohol or water containing a rust inhibitor.

12. A common rail comprising a common rail body in which a rail hole and a branch hole which is formed in a cylindrical wall region enclosing the rail hole are formed, and a holder in which a communication hole communicating with the branch hole is formed, wherein the common rail body and the holder contain chemical components of 0.01-0.3 mass % of C,
0.01-0.5 mass % of Si,
0.01-3.0 mass % of Mn,
0.0003-0.01 mass % of B,
0.001-0.01 mass % of N,
over 0.01-0.5 mass % of Al,
0.01-0.05 mass % of Ti,
P limited to 0.03 mass % or less,
S limited to 0.01 mass % or less,
O limited to 0.01 mass % or less,
a total content of As, Sn, Sb, Pb, and Zn limited to 0.015 mass % or less, and
a balance including Fe and inevitable impurities,
in which a TLB value represented by Formula (1):

TLB=(B %)−[(N %)/1.3−{(Ti %)/3.4+(Al %)/4.1}×(Al %)×52]

is 0.001% or more, the opening peripheral zone has a shape in which a radius of curvature of a shape line at the opening peripheral zone of the branch hole viewed in a cross-section extending in a longitudinal direction of the rail hole and including a center line of the branch hole is 15 μm or greater at points of a region satisfying Formula (3):

Diameter of branch hole×0.5≤Distance from center of branch hole≤Diameter of branch hole×0.6, and a compressive stress value in a direction perpendicular to a longitudinal direction of the rail hole in the cross-section is −200 MPa or greater.

* * * * *

UNITED STATES PATENT AND TRADEMARK OFFICE
CERTIFICATE OF CORRECTION

PATENT NO.        : 8,794,215 B2                                    Page 1 of 1
APPLICATION NO.   : 12/736247
DATED             : August 5, 2014
INVENTOR(S)       : Koji Hirano et al.

It is certified that error appears in the above-identified patent and that said Letters Patent is hereby corrected as shown below:

In the Specification

Column 4, line 15, change "mass %, of Mg" to -- mass % of Mg --;

Column 23, line 58, change "the Steel No 52" to -- the Steel No. 52 --;

Column 27, Table 2, No. 2, column Mn, change "0.78" to -- 0.76 --.

Signed and Sealed this
Seventh Day of April, 2015

Michelle K. Lee
*Director of the United States Patent and Trademark Office*